United States Patent
Maimone et al.

(12) 
(10) Patent No.: US 6,655,002 B1
(45) Date of Patent: Dec. 2, 2003

(54) MICROACTUATOR FOR USE IN MASS DATA STORAGE DEVICES, OR THE LIKE, AND METHOD FOR MAKING SAME

(75) Inventors: Peter J. Maimone, Irvine, CA (US); Tsen-Hwang Lin, Dallas, TX (US); Kurt P. Wachtler, Richardson, CA (US)

(73) Assignee: Texas Instruments Incorporated, Dallas, TX (US)

( * ) Notice: Subject to any disclaimer, the term of this patent is extended or adjusted under 35 U.S.C. 154(b) by 297 days.

(21) Appl. No.: 09/607,415

(22) Filed: Jun. 28, 2000

(51) Int. Cl.[7] .............................................. H02K 15/16
(52) U.S. Cl. ........................ 29/596; 427/404; 427/419.1
(58) Field of Search ........................... 29/596; 427/404, 427/419.1

(56) References Cited

U.S. PATENT DOCUMENTS

| | | | |
|---|---|---|---|
| 4,253,231 A | * | 3/1981 | Nouet .......................... 29/602 |
| 5,189,578 A | | 2/1993 | Mori et al. |
| 5,455,064 A | * | 10/1995 | Chou et al. ..................... 427/79 |
| 5,479,695 A | * | 1/1996 | Grader et al. ............... 29/602.1 |
| 5,724,015 A | | 3/1998 | Tai et al. |
| 5,867,347 A | | 2/1999 | Knight et al. |
| 5,959,808 A | | 9/1999 | Fan et al. |
| 6,193,832 B1 | * | 2/2001 | Naeem ......................... 156/250 |
| 6,224,951 B1 | * | 5/2001 | Centanni et al. ............. 427/537 |
| 2002/0063107 A1 | * | 5/2002 | Moon et al. ..................... 216/2 |

OTHER PUBLICATIONS

Magnardi, "From ICs to DMD(TM)s", TI Technical Journal, pp. 56–63, Jul.–Sep. 1998.

* cited by examiner

Primary Examiner—Gregory Vidovich
Assistant Examiner—Stephen Kenny
(74) Attorney, Agent, or Firm—W. Daniel Swayze, Jr.; W. James Brady; Frederick J. Telecky, Jr.

(57) ABSTRACT

A microactuator, or micromotor, (60) and method for making it are presented such that a symmetrical build up of material is performed on opposite sides of a substrate. This reduces mechanical stresses in the device. In its construction, respective layers of circuit portions (108, 110) are built on each side of the structure, thereby eliminating the need to stack complex patterns. Stacking one complex pattern on top of a similar pattern is difficult because the surface, which is the base for subsequent layers, is not flat. The photolithography process that forms these patterns is not very forgiving to non-flat surfaces. Avoiding the stacked layers also allows thicker conductors to be considered for each circuit. Thicker circuits increase current carrying capacity, which in one of the key variables increase the power of the micromotor.

17 Claims, 23 Drawing Sheets

MICROACTUATOR FOR USE IN MASS DATA STORAGE DEVICES, OR THE LIKE, AND METHOD FOR MAKING SAME

CROSS REFERENCES TO RELATED PATENT APPLICATIONS

This invention is related to application Ser. No. 09/607,414 filed Jun. 28, 2000 application Ser. No. 09/607,087 filed Jun. 28, 2000 and application Ser. No. 09/607,413 filed Jun. 28, 2000.

BACKGROUND OF THE INVENTION

1. Field of the Invention

This invention relates in part to improvements in methods and apparatuses for dynamic information storage or retrieval, and more particularly to improvements in methods and circuitry for positioning a transducer for writing or detecting data written onto a spinning data disk, and still more particularly to improvements in microactuator structures and methods for making same. This invention also relates in part to improvements in components used in microelectromechanical systems and methods for making same.

2. Relevant Background

Mass data storage devices include well known hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Many applications are still being developed. Applications for hard disk drives are increasing in number, and are expected to further increase in the future. Mass data storage devices may also include optical disks in which the optical properties of a spinning disk are locally varied to provide a reflectivity gradient that can be detected by a laser transducer head, or the like. Optical disks may be used, for example, to contain data, music, or other information.

In the construction of mass data storage devices, a data transducer, or head, is generally carried by an arm that is selectively radially positionable by a servo motor. Recently, micromotors, or microactuators, have been investigated to provide better, or more accurate, position control of the head.

In one design, a piezoelectric "I-beam" element has the actuator mounted on an arm or suspension element. The actuator may be co-located with the head on the end of a suspension to provide a fine positioning capability to the head. However, the piezoelectric element suffers several disadvantages. For example, voltages on the order of 30 volts are required for suitable operation. Such high voltages are undesirable in most hard disk drive applications. Also, the range of movement that can be achieved is on the order of only ±1 μm. This may be enough with sufficiently high disk rotation velocities, but it is generally seen as a limitation of this system.

In another design, a microactuators that has been investigated has a microactuator element co-located with the head on the end of the arm. The microactuator may be rectangular in shape, with a platform portion to which the head is attached, and a frame portion to which the platform is tethered. The platform and frame are designed to allow the platform to freely move in only one direction in response to a current applied to associated coils. The movement of the platform causes fine radial movement of the head, for example, on the order of ±5 μm, in an axis normal to the length of the arm.

Through the provision of fine head positioning, such as by the microactuators of the type described, the track density can be packed closer together since the head position can be more accurately controlled. Thus, the higher precision of head positioning can lead to a higher number of tracks per inch that can be created on the disk. Also, the speed of the motor can be increased, and the quality of the bearings can be decreased, since the head can be more accurately positioned.

From a three-dimensional perspective, when multiple disks are used with corresponding multiple heads, the ability to provide fine position control to individual heads of the stack of heads and disks enables each head to be individually positioned to tracks within its position control range. This is in contrast to structures that are required to track along the same paths as each of the other heads. This adds great flexibility and functionality to the drive that would not otherwise be available. Among other things, this would provide an ability to write to the disks with parallel data streams, greatly increasing its speed.

In the construction of microactuators in the past, one process that was used began with a silicon wafer about 24 mils thick. For example, a cross-section side view of a portion 10 of a microactuator is shown in FIG. 1. As can be seen, a nickel-iron structure 12 is formed on a silicon wafer substrate 14, on both sides of a gap 16. The gap 16 shown is the gap separating the tethered wafer structure 18 and the surrounding arm structure 20.

A dielectric material 22 is built up adjacent to the nickel-iron material 12, and copper coils 24 and connection wiring 26 surround a portion of the nickel-iron structure 12, encapsulated by the dielectric 22. The various structures are built up in layers by photolithographic, material deposition, lapping, and other known processes. These layers of dielectric, copper, and nickel-iron were built up on the wafer to form a sandwich of materials. The nickel-iron provided a necessary magnetic material, and the copper formed the coils to which a positioning current may be applied. Then con wafer was lapped, sawed, or ground off to produce a microactuator which had a thickness on the order of about 100 μm. Once this was done, however, due to the significantly differences of thermal coefficients of expansion of the various materials, the extremely thin resulting part was extremely vulnerable to warping or buckling. The various parts also tend to delaminate from the remaining wafer substrate, and made the production yield extremely small.

Limited capability of either molding or a photographic process, which is utilized to construct the high aspect ratio (height-to-width) layers of metal and dielectric material, are also important problems. The thickness of these material layers is a primary factor in generating the required amount of magnetic force in the micromotor, or microactuator. This force, in turn, drives the amount of travel of the platform in the motor. Large travel is a key market desire.

What is needed, therefore, is a microactuator structure and method for constructing it that results in a device that is not as susceptible to the stresses caused by the differences in the thermal coefficients of expansions of the various required materials.

Additionally, recent interest has been devoted to microelectromechanical systems (MEMS), for many varied applications, such as accelerometers, mirror positioning, and the like. In many MEMS control devices, a platform is suspended by a hinge or tether in a window in a larger yoke or base. However, the substrates upon which such structures are constructed are generally very thin, on the order of a few to a few hundred microns. Consequently, they suffer the same distortion problems as described above with respect to the mass data storage device positioning arms.

SUMMARY OF THE INVENTION

In light of the above, therefore, it is an object of the invention to provide a microactuator or micromotor device that is less susceptible to distortion or warping, due to differences in thermal expansion of the various parts used to realize the structure.

It is another object of the invention to provide improved methods for manufacturing microactuator or micromotor devices, for use, for example, in mass data storage devices or microelectromechanical systems.

Thus, according to one aspect of the invention, a method for making a micromotor or microactuator is presented such that a symmetrical build up of material is allowed, thus reducing mechanical stress. More particularly, one layer of circuits is built; on each side of the structure, thereby eliminating the need to stack complex patterns. Stacking one complex pattern on top of a similar pattern is difficult, because the surface, which is the base for subsequent layers, is not flat. The photolithography process that forms these patterns is not very forgiving to non-flat surfaces. Avoiding the stacked layers also allows thicker conductors to be considered for each circuit. Thicker circuits increase current carrying capacity, which is one of the key variables that increases the power of the micromotor.

According to another aspect of the invention, a method is presented to build a balanced micromotor by starting with a thin silicon wafer, plasma etching the desired pattern for the coil traces into the silicon and then plating copper or other electrically conductive metal into that pattern. NiFe metal is then built up on the two sides of the silicon, at the interface between the movable and non-movable segments of the device, and through the middle of the coil traces. This completes the material set required to form an electromagnetic field that is the source of the force driving the movement of the micromotor.

In yet another embodiment, a manufacturing method is presented which is similar to previous methods except that the sequential layers are added to both sides of the silicon wafer. This provides a balanced mechanical stress structure. This alternative utilizes a variation of the above-described method to form the electrical path to connect the bottom and top circuits. The silicon will be removed and an electrically conductive material, such as copper, will be deposited in the via. The layers of circuits for the motor coils and the NiFe are added in an alternating, sequential manner to the two sides of the silicon.

In still another embodiment, a piece-part manufacturing approach is presented. In this approach, two NiFe parts and dielectric and copper piece-parts are manufactured separately. This method allows the NiFe parts to be designed in a manner to maximize the thickness of the metal, which in turn increases the magnetic properties of the motor. The dielectric and copper coils piece-part may be a thin-film interconnect or some derivative of a standard flex circuit printed wiring board. These piece-parts may be tested individually, defective parts discarded, and only functional units assembled. This not only produces a mechanically balanced construction, but has lower cost due to non-sequential manufacturing steps. The dielectric and copper coils piece-part also provides the path for electrical connections to the movable platform and a relatively easy method for electrical connection off the microactuator and onto the hard disk drive system.

Thus, according to a broad aspect of the invention, a microactuator of the type having base and a platform hinged or tethered thereto is presented. The microactuator has first microactuator elements constructed on the base and second microactuator elements mounted on the opposite side of the base. The first microactuator elements are located substantially symmetrically on either side of a plane along a centerline of the substrate base so that warpage of the parts due to thermal expansion of the parts on each side of the plane cancel.

According to another broad aspect of the invention, a microactuator for use in a mass data storage device of the type having an arm that carries a transducer that is selectively positioned adjacent a spinning rotating disk is presented. The microactuator has a first portion carried by the arm and a second portion tethered in an aperture in the first portion to form a platform therewithin. First microactuator elements are mounted in the first portion, and second microactuator elements are mounted in the second portion so that movement of the platform moves a position of the transducer. The first microactuator elements are located substantially symmetrically on either side of a plane along a centerline of the first portion.

According to another broad aspect of the invention, a method is presented for manufacturing a microactuator structure. The method includes providing a substrate having first and second opposing sides, and alternatively and sequentially building up structure layers of the microactuator on the first and second sides.

According to yet another broad aspect of the invention, a method for manufacturing a microactuator structure is presented. The method includes providing a substrate having first and second opposing sides, and simultaneously building up structure layers of the microactuator on the first and second sides.

BRIEF DESCRIPTION OF THE DRAWINGS

The invention is illustrated in the accompanying drawings, in which.

In the various Figures of the drawing, like reference numerals are used to denote like or similar parts.

DETAILED DESCRIPTION OF THE PREFERRED EMBODIMENTS

Figures 1, 2A:
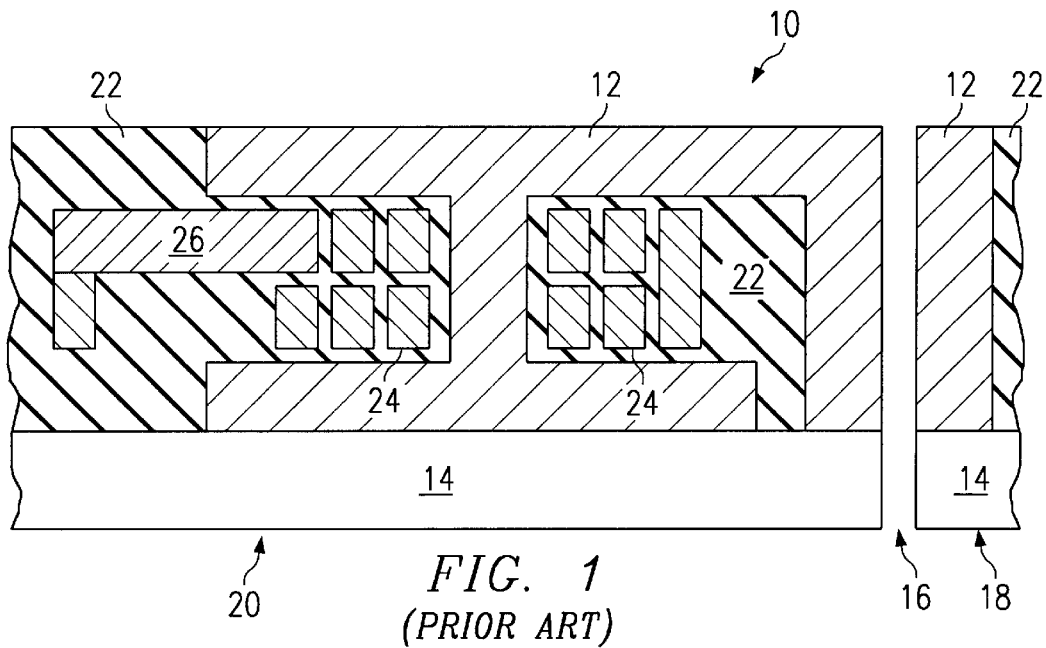
FIG. 1 is a side cross-section of a microactuator structure, according to the prior art.
FIG. 2A is a block diagram of a mass data storage device, illustrating the environment of the invention.

FIG. 2A is a block diagram of a generic disk drive system 25, which represents the general environment in which the invention may be practiced. The system 25 includes a magnetic media disk 26 that is rotated by a spindle motor 28 and spindle driver circuit 30. A data transducer or head 32 is locatable along selectable radial tracks (not shown) of the disk 26 by a voice coil motor 34, along a gross radial position 36. A microactuator 38, which may be constructed in accordance with one of the methods of the invention, described below in detail, may be co-located with the head 32 on the end of the arm 40, as shown in detail in FIG. 2B. The motion of the microactuator 38 may be a displacement to the left or right of the arm 40 axis, to provide fine radial positioning of the head 32 along fine radial position 42.

The radial tracks may contain magnetic states that contain information about the tracks, such as track identification data, location information, synchronization data, as well as user data, and so forth. The head 32 is used both to a record user data to and read user data back from that disk 26. The head 32 also detects signals that identify the tracks and sectors at which data is written, and to detect servo bursts that enable the head 32 to be properly laterally aligned with the tracks of the disk, as below described.

Analog electrical signals that are generated by the head 32 in response to the magnetic signals recorded on the disk 26 are preamplified by a preamplifier 44 for delivery to read channel circuitry 46. Servo signals, below described in detail, are detected and demodulated by one or more servo demodulator circuits 48 and processed by a digital signal processor (DSP) 50 to control the gross 36 and fine 42 positions of the head 32 via a positioning driver circuit 52. In the past, the servo data would that. is read and processed has been analog data that has been interpreted by the DSP 50 for positioning the head 32.

A microcontroller 54 is typically provided to control the DSP 50, as well as the interface controller 56 to enable data to be passed to and from the host interface (not shown) in known manner. A data memory 58 may be provided, if desired, to buffer data being written to and read from the disk 26.

Figure 2B:
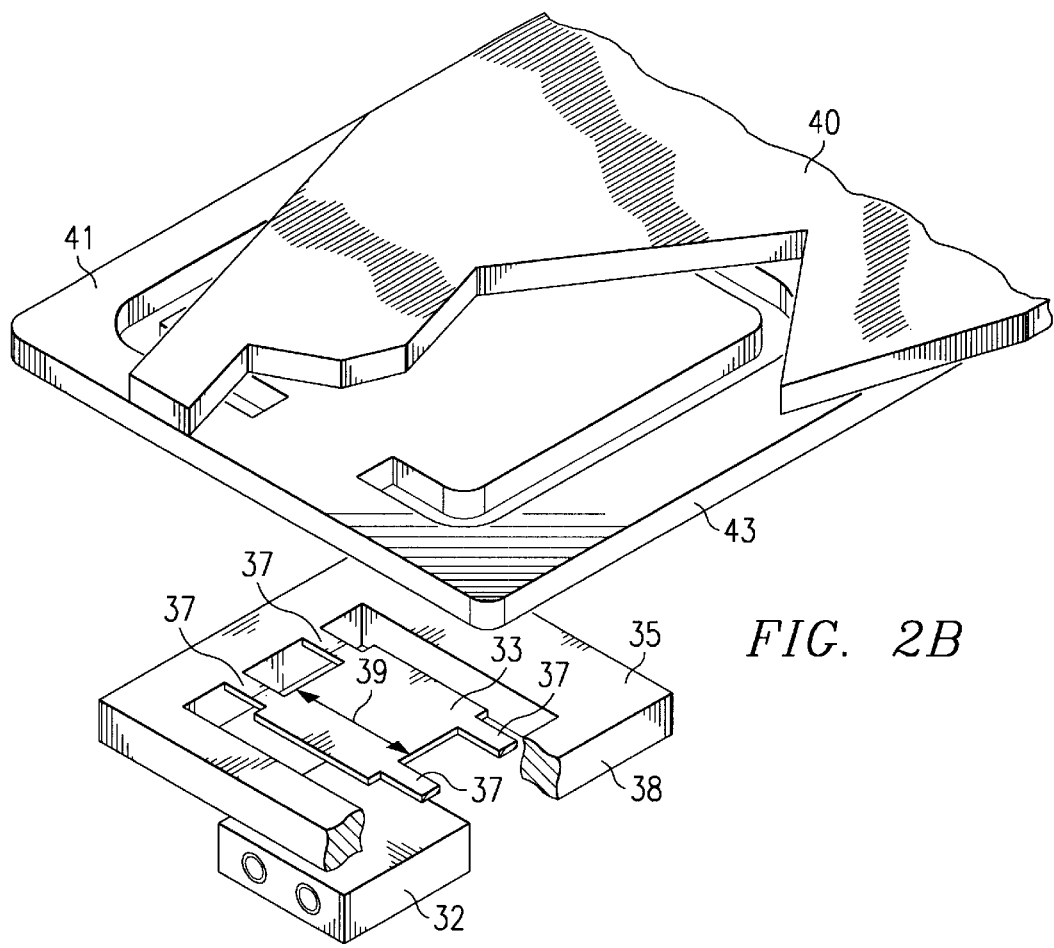
FIG. 2B is an exploded view of a portion of the arm structure of FIG. 2A that carries the read/write head.

With reference additionally now to FIG. 2B, one microactuators environment that may be used includes a microactuator 38 that is co-located with the head 32 on the end of the arm 40. The microactuator 38 may be rectangular in shape, and includes two parts. The first part is a platform 33 to which the head 32 is attached. The second part is a frame 35 around the platform 33. These two parts are joined by tethers 37 that are designed to allow the platform 33 to freely move in only one direction 39.

The frame 35 may be attached to a paddle 41 formed as a part of a flexure element 43. The paddle 41 acts as a bearing or gimbal to allow movements of the frame 35 and head 32, for example, due to changes in elevation of the disk surface, or other surface nonuniformity.

Typical tether sizes, for example, are on the order of 4 μm wide by 100 μm high by 180 μm long. Coils (not shown) are also located on and adjacent the frame 35 at strategic locations so that the application of a current to the coils causes the platform to move. The movement of the platform 33 causes fine radial movement of the head 32, for example, on the order of ±5 μm, in an axis normal to the length of the arm 40.

Figure 3:
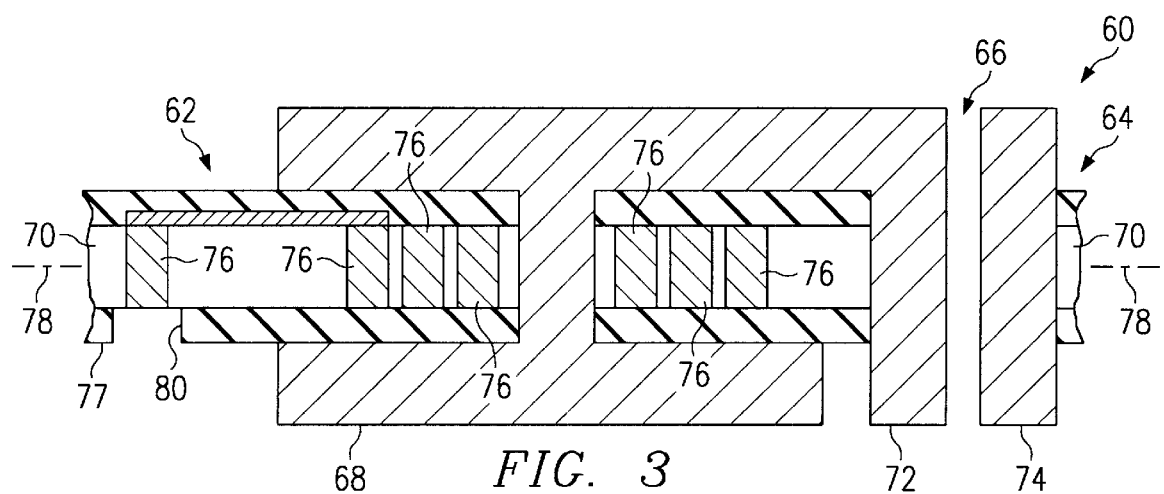
FIG. 3 is a side cross-section of a microactuator structure, according to a preferred embodiment of the invention, constructed using a silicon mold technique, according to a preferred method embodiment of the invention.

With respect to the manufacturing of the microactuator, to minimize warping caused by an unbalanced deposition of materials onto a substrate, a balanced or symmetrical arrangement of microactuator parts is provided, in accordance with a preferred embodiment of the invention. Thus, with additional reference now to FIG. 3, one balanced construction configuration of a microactuator is shown. FIG. 3 shows a portion of a microactuator 60, which includes a first portion 62 that is constructed in the shape of a frame that is to be rigidly attached to the arm, and a second portion 64 that forms a platform located within a hole in the first portion 62 to be moveable to cause lateral movement of the platform and head (not shown) which has been rigidly attached and carried thereon. The platform 64 is spaced from the first portion 62 by a gap 66.

An "I" shaped nickel-iron member 68 is formed extending through a central silicon substrate 70. The nickel-iron member 68 has a downwardly extending portion 72 on the frame side 62. A corresponding downwardly extending nickel-iron member 74 is also provided on the platform member 64.

A plurality of copper coils 76 are provided surrounding the center portion of the nickel-iron structure 68 to generate a magnetic flux in the nickel-iron structure 68 when the copper coils are energized, for example, by a current passing therethrough. The flux in the nickel-iron member 68 is transferred between the downwardly extending portions 72 and 74 to cause the platform portion 64 to be moved to produce a resultant movement in the arm to move the head or transducer thereon.

It should be observed that the various structures in the embodiment 60 illustrated are substantially symmetrical about a plane 78 extending centrally through the silicon substrate 70. with respect to the top and bottom thereof. Thus, in the embodiment illustrated, the coil members 76 are actually embedded in the silicon substrate 70, contained between the top and bottom surfaces thereof.

A dielectric layer 77 is provided on the top and bottom portions of the silicon substrate 70 to isolate the nickel-iron member 68 from the conductive copper coils 76. A hole 80 is formed in the dielectric member 77 to facilitate electrical contact to the copper coils 76 to enable an actuating current to be passed therethrough.

Figure 4:
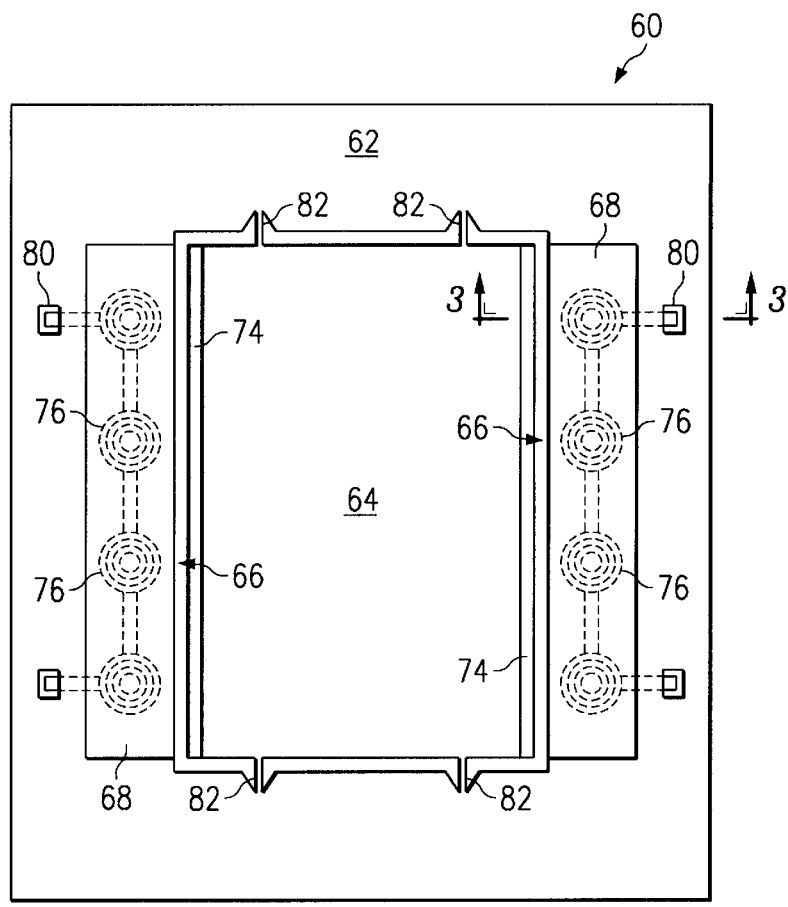
FIG. 4 is a top plan view of the microactuator structure of FIGS. 3, 6, and 8 according to a preferred embodiment of the invention.

A plan view of the device 60 of FIG. 3 is shown in FIG. 4, to which reference is now additionally made. As can be seen, the center-platform portion 64 maybe held to the arm portion 68 by tethers 82 at the respective corners thereof to be spaced from the frame portion 62 by a surrounding gap 66. The coils 76 are located on the frame portion to generate the magnetic flux in the nickel-iron members 68.

One method for constructing the device 60 of FIGS. 3 and 4 is shown in the steps illustrated in FIGS. 5A–5I, to which reference is now additionally made. At the start, two silicon wafers 70 and 84 are provided. The silicon wafer 84 will serve as a base or carrier to enable processing of the silicon wafer 70, which will become the final silicon substrate of the microactuator. One face of the silicon wafer 70 is coated with a layer 86 of a seed material, preferably copper, or the like. The copper layer 86 will serve both as an etch stop or indicator, as will be apparent from FIG. 5D described below in detail and as the electrically conductive path to allow electroplating of features as will be apparent from FIG. 5E described below in detail. The copper layer 86 may be, for example, 2000 Å to 4000 Å thick. The copper layer 86 is then coated with a layer of high sodium glass 88.

Figure 5A:
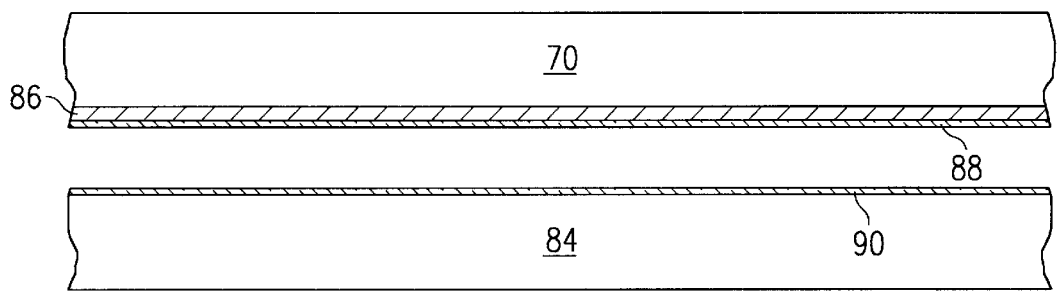
FIGS. 5A–5I are side cross-section drawings illustrating the sequence of steps used in making the microactuator structure of FIG. 3, according to a preferred embodiment of the invention.
Figure 5B:
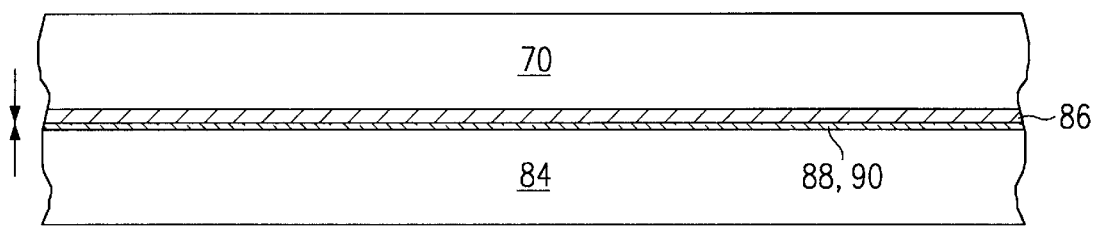

Similarly, the silicon wafer 84 is coated with a similar layer of high sodium glass 90. The high sodium glass layers 88 and 90 enable the silicon wafers 70 and 84 to be joined by bringing them into contact and heating them and/or passing a suitable current through them, until the high sodium glass layers join together, as shown in FIG. 5B. Alternatively, the high sodium glass layers 88 and 90 may be replaced with a suitable cast film of adhesive material (not shown). If the thickness is held uniformly thick, the levelness of the resulting structure can be held to a suitable tolerance.

Figure 5C:
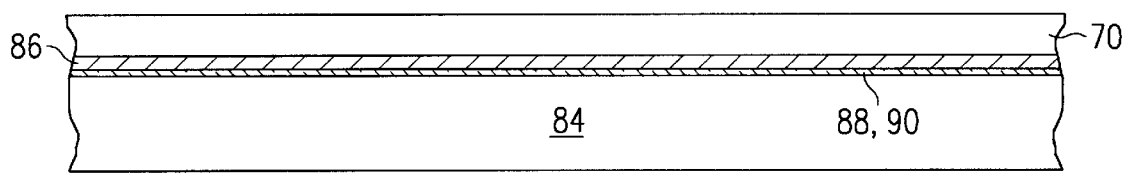

As next shown in FIG. 5C, the top portion of the wafer 70 is removed, for example, by lapping or other suitable technique to provide a wafer of desired thickness, that will be used in the final microactuator structure. A suitable thickness may be for example, between about 100 $\mu$m and 200 $\mu$m, and may preferably be about 125 $\mu$m.

Figure 5D:
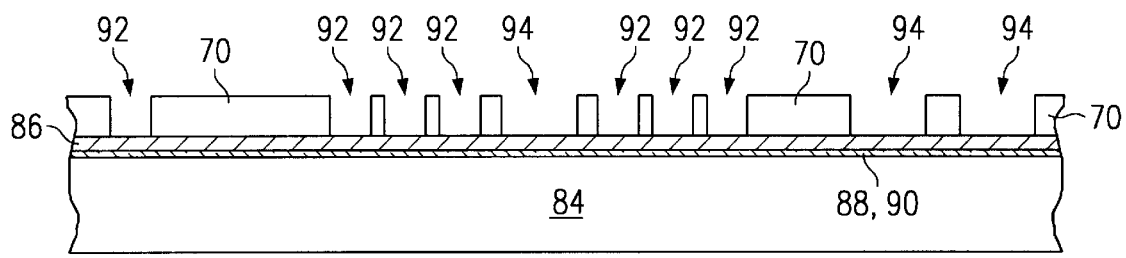

As shown in FIG. 5D, the top silicon layer 70 is etched to form patterned trenches 92 into which the copper materials will be deposited to form the coils of the actuator, and trenches 94 into which the nickel-iron structures to provide the magnetic flux carrying member. The trenches 92 may be, for example, between about 5 $\mu$m and 15 $\mu$m, and may preferably be about 10 $\mu$m, and the trenches 94 may be, for example, between about 20 $\mu$m and 200 $\mu$m, and may preferably be about 75 $\mu$m. The spacers between the trenches 92 may be, for example, between about 5 $\mu$m and 10 $\mu$m, and may preferably be about 7 $\mu$m.

Figure 5E:
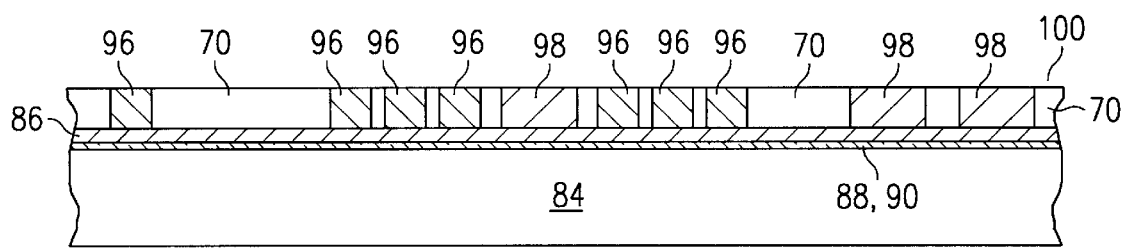

As shown in FIG. 5E, the copper 96 and nickel-iron 98 materials are then electroplated into the respective trenches 92 and 94 and the excess materials removed from the top surface 100 of the silicon substrate 70. Although the copper and nickel-iron are shown to be deposited in a single step in FIG. 5E, it will be understood that the copper and nickel-iron would be deposited in sequential steps, using, for example, patterned photoresist to expose only those trenches or windows into which the respective copper or nickel-iron is to be deposited.

Figure 5F:
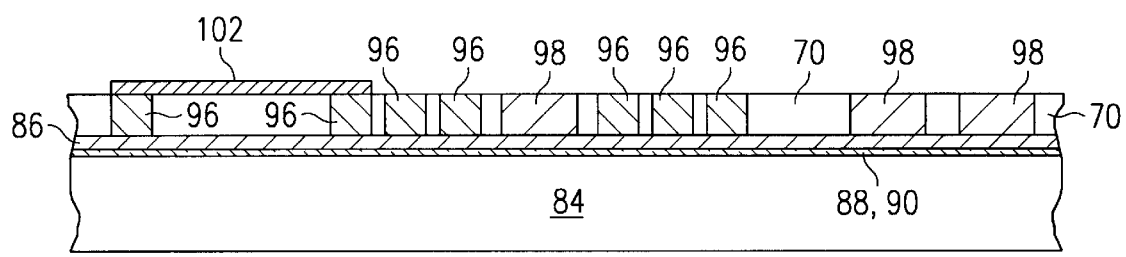

Thus, for example, a layer of photoresist may be applied overall and patterned to expose the windows into which copper to form at least a portion of the actuating coils is to be deposited. The copper is then deposited and etched back to the desired top level. The photoresist is then removed and a second photoresist layer is applied and patterned to expose the windows where trenches 94 into which the nickel-iron material are to be deposited. The nickel-iron material is then deposited and etched back to form the desired height level. In the embodiment shown, the desire height level for both the copper and nickel-iron layers is the top and bottom surfaces of the substrate 70. The photoresist layer is then removed. The coil and other interconnections 102 are then added, as shown in FIG. 5F.

Figure 5G:
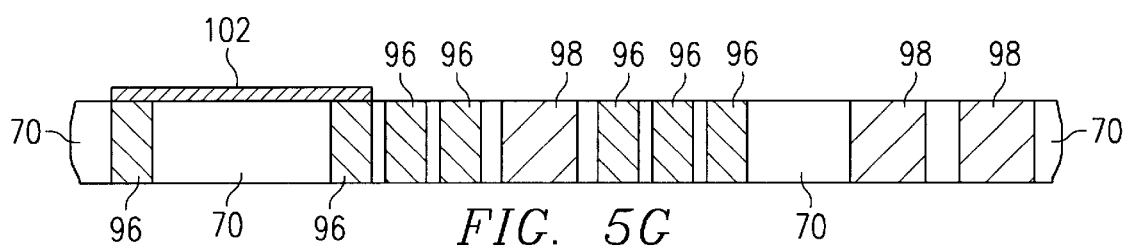
Figure 5H:
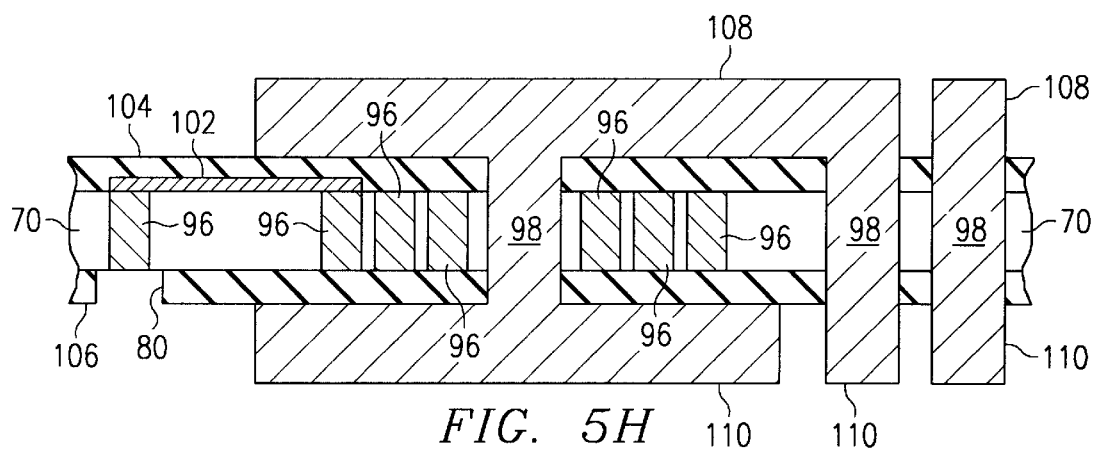

At this point, the bottom layers that include the silicon supporting base 84, high sodium glass 88,90, and copper layer 86 are then removed from the structure, for example, by lapping or other suitable technique, as shown in FIG. 5G. As shown in FIG. 5H, dielectric layers 104 and 106 are respectively deposited on the top end bottom surfaces of the silicon substrate 70, including the copper structures 96 thereon, but not over the nickel-iron structures 98. The dielectric layer 104 is then suitably patterned to enable top and bottom patterned nickel-iron material 108 and 110 to be formed in contact with the nickel-iron structures 98 that remain in the silicon substrate 70. The thickness of the nickel-iron layers 108 and 110 may be, for example, between about 20 $\mu$m and 100 $\mu$m, and may preferably be about 40 $\mu$m.

Figure 5I:
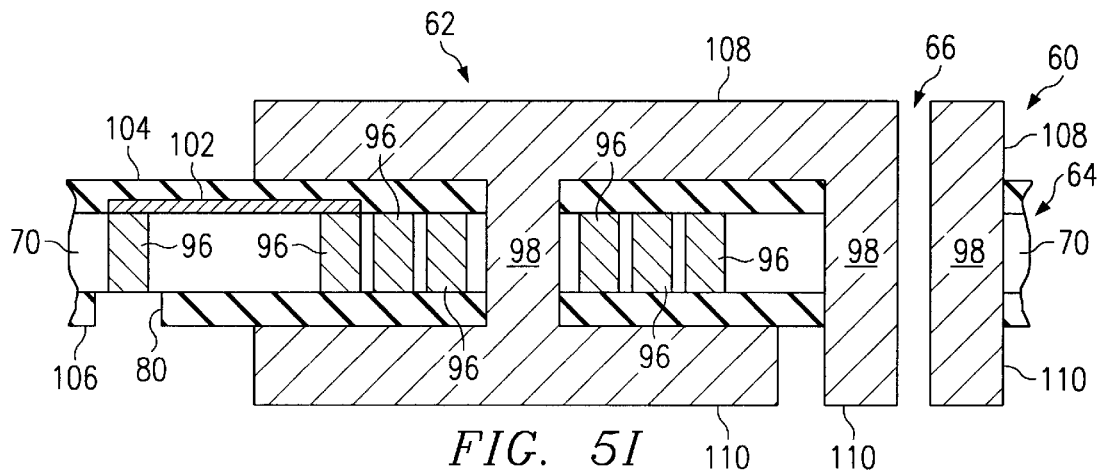

Finally, as shown in FIG. 5I, the dielectric and silicon materials are selectively removed from the gap 66 leaving only tethers which connect the platform 64 to the frame 62 to produce the final electromechanical actuator structure 60. The dielectric and silicon materials may be removed from the gap 66, for example, using one or more directional plasma etching techniques and appropriate masking. The gap 66 may be, for example, between about 3 $\mu$m and 15 $\mu$m wide, and may preferably be about 7 $\mu$m wide.

Figure 6:
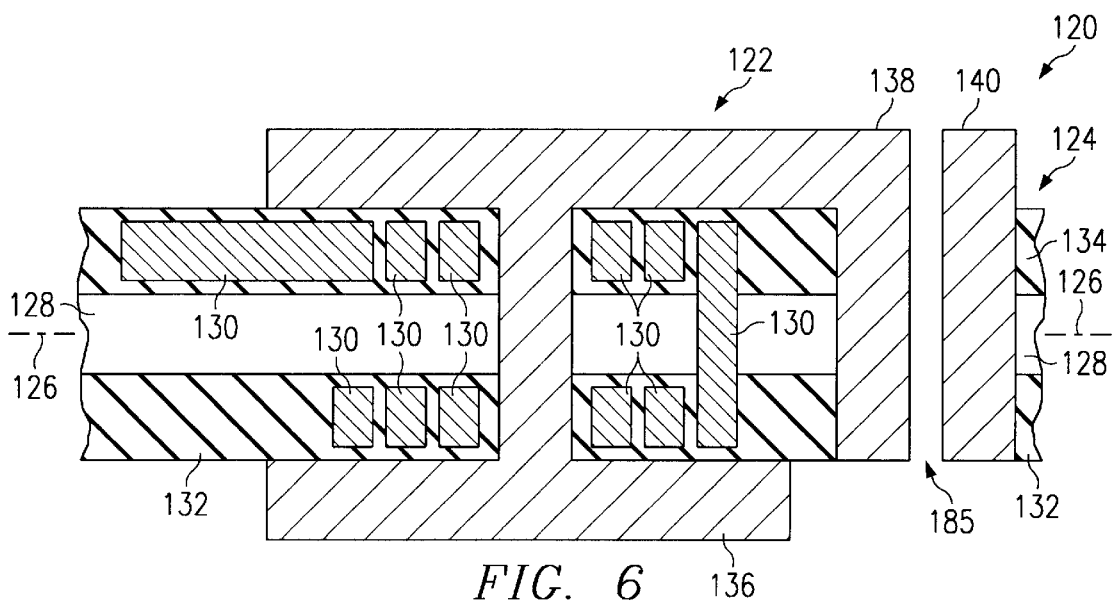
FIG. 6 is a side cross-section of a microactuator structure, according to a preferred embodiment of the invention, constructed using a double-sided sequential build up method, according to a preferred method embodiment of the invention.

Another embodiment of a microactuator 120 is shown in FIG. 6, to which reference is now additionally made. The microactuator 120 is similar to the microactuator 60 shown in FIG. 3, except that the coil material is not imbedded in the silicon substrate.

More particularly, the microactuator 120 has a first portion 122 that forms a frame that is connected to a second portion that forms the tethered island or platform 124 for moving the head (not shown). The frame portion 122 and the platform portion are formed in a substantially symmetrical fashion about a plane 126 that is essentially located along the centerline of a silicon substrate 128. The copper coils 130 are formed adjacent and above the top and bottom surfaces of the silicon substrate 128, embedded in dielectric layers 132 also on the top and bottom of the silicon substrate 128. The dielectric layers 132 and 134 isolate the copper coils 130 and their interconnection traces 131 electrically from other parts of the device. Finally, the nickel-iron "I" shaped member 136 is provided with an end piece 138 and a corresponding actuator receiving piece 140 to transfer the magnetic flux generated by the coils 130 across the gap 185 to move the platform 124.

It is observed that the overall structure of the microactuator 120 is substantially symmetric with respect to the centerline plane 126 through the silicon substrate 128. As a result, due to the differences in the coefficient of thermal expansion, changes one side of the silicon substrate 128 would be matched by similar changes of the materials on the opposite side. This results in a decrease in the likelihood of the overall structure or parts thereof cupping, bowing or otherwise distorting.

The plan view of the finished microactuator is substantially the same as the plan view of FIG. 4 described above with reference to the microactuator 60 of FIG. 3.

One method for making the microactuator 120 is shown in sequential steps illustrated in the cross-section views of FIGS. 7A–7HH, to which reference is now additionally made. In the method of this embodiment, the structures are formed first on one side of the substrate 128, then on the other. The start of the construction of the microactuator 120 begins with the provision of two silicon wafers 128 and 142. The wafer 142 provides a support or base to enable the construction of the various parts of the microactuator in and around the upper silicon wafer 128, and serves as a sacrificial carrier wafer. The upper silicon wafer 128 has a coat of a seed material, such as copper, or the like 146 on a bottom face thereof. The copper layer may be, for example, 2000 Å to 4000 Å thick. The copper layer 146 is coated with a layer of high sodium glass 148. Similarly, the top surface of the silicon wafer 142 has a layer of high sodium glass 150 formed thereover.

Figure 7A:
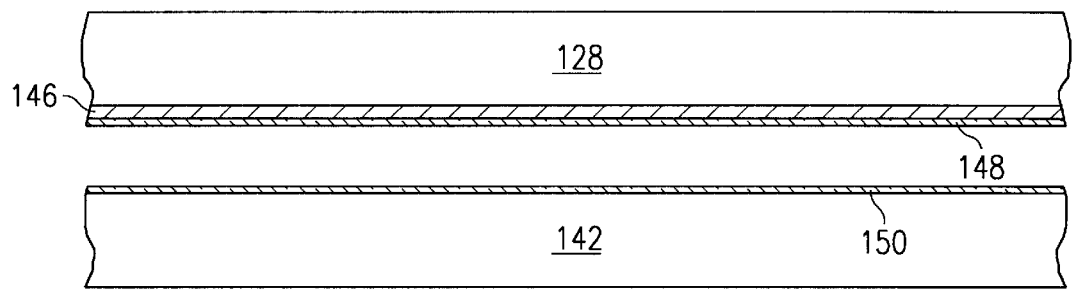
FIGS. 7A–7HH are side cross-section drawings illustrating the sequence of steps used in making the microactuator structure of FIG. 6, according to a preferred embodiment of the invention.
Figure 7B:
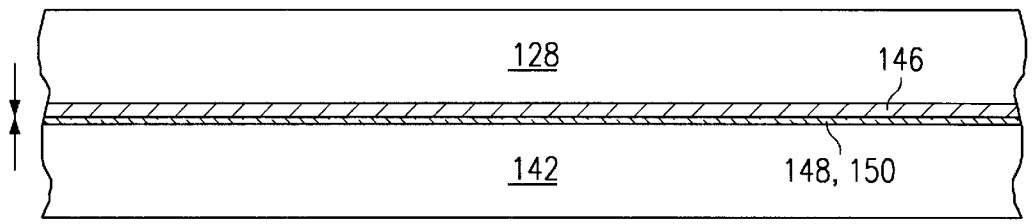

As shown in FIG. 7B, the top and bottom silicon wafers 128 and 142 are bonded together, by heating the structure to a temperature of about 300° C. and applying a voltage of a few hundred volts to create a single structure, as shown. Again, alternatively, the high sodium glass layers 148 and 150 may be replaced with a suitable cast film of adhesive material (not shown). If the thickness is held uniformly thick, the levelness of the resulting structure can be held to a suitable tolerance.

Figure 7C:
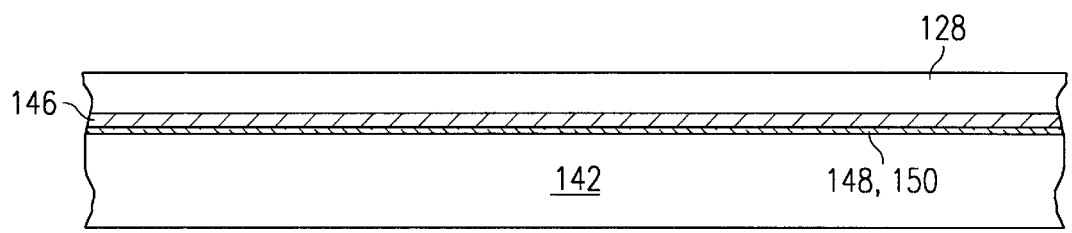
Figure 7D:
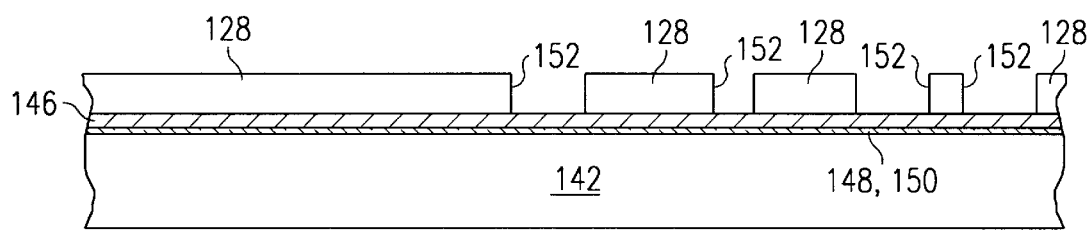
Figure 7E:
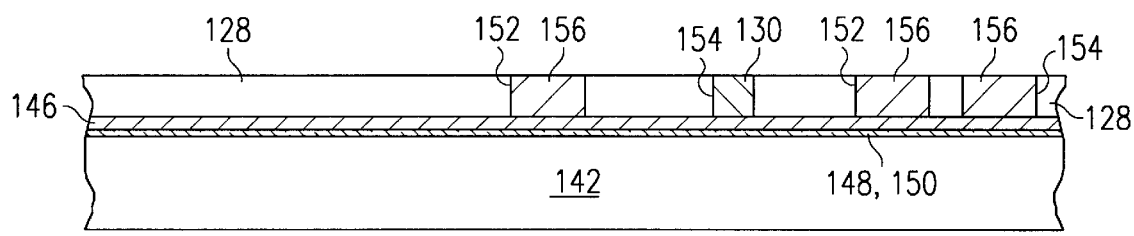

As shown in FIG. 7C the top silicon wafer 128 is thinned, for example, by lapping, or other appropriate process, to the desired thickness. A suitable thickness for the top wafer 128 may be for example, between about 100 $\mu$m and 200 $\mu$m, and may preferably be about 125 $\mu$m. The top silicon wafer 128 is then imaged and etched with a pattern to form a mold into which the required metal features will be formed, as shown in FIG. 7D. The pattern includes a number of apertures or windows 152 that will receive the metal for the copper wiring and nickel-iron materials. The copper 154 and nickel-iron 156 features are then molded into the apertures 152, as shown in FIG. 7E. The width of the windows 152 and the nickel-iron features 156 molded thereinto may be, for example, between about 25 $\mu$m and 200 $\mu$m, and may preferably be about 75 $\mu$m. A second layer of seed material, such as copper, 158 is then formed overall, as shown in FIG. 4F. The copper layer may be, for example, 2000Å to 4000 Å thick.

Figure 7F:
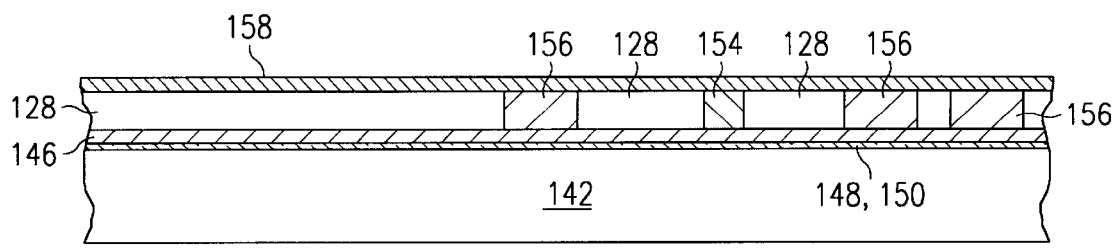
Figure 7G:
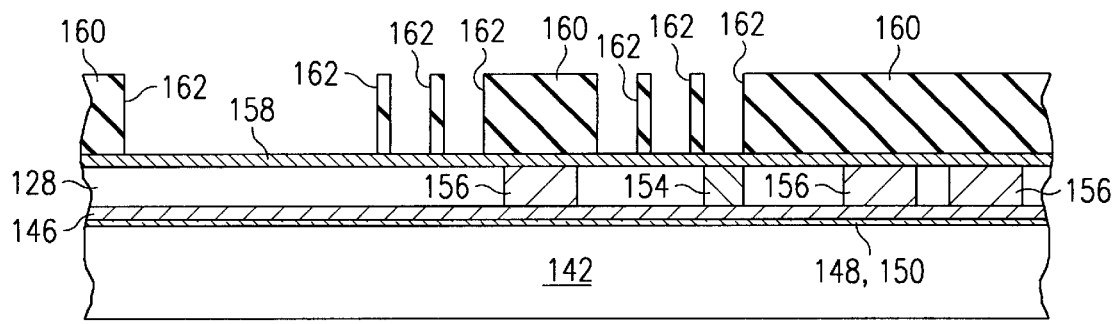

As shown in FIG. 7G, the copper layer 158 is then coated with a layer of photoresist material 160, which is patterned to form a mold to contain the copper coils and interconnection traces. Thus, the photoresist layer 160 is patterned to form windows 162 into which the copper coil and copper traces will be subsequently molded or plated. The windows 162, and the copper material that will be plated thereinto may be, for example, between about 5 $\mu$m and 15 $\mu$m, and may preferably be about 10 $\mu$m. The space between the windows 162 may be, for example, between about 5 $\mu$m and 10$\mu$m, and may preferably be about 75 $\mu$m.

Figure 7H:
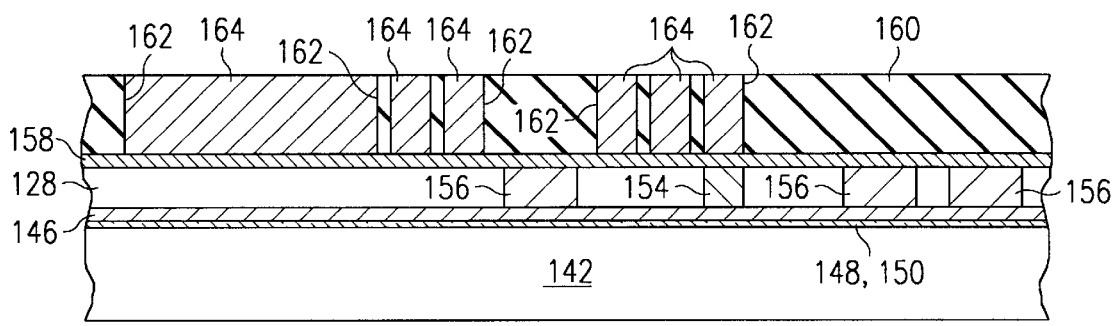
Figure 7I:
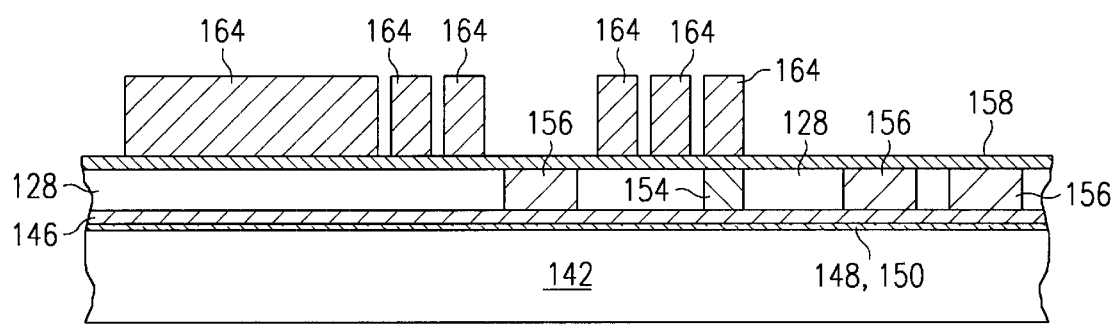

Next, as shown in FIG. 7H, copper material is electroplated into the windows 162 of the photoresist layer 160, as shown in FIG. 7H. The copper material, denoted by the reference numeral 164, will form one-half of the coils 130 (see FIG. 6). Following the formation of the copper in the apertures of the photoresist layer 160, the photoresist layer 160 is removed or stripped as shown in FIG. 7I.

Figure 7J:
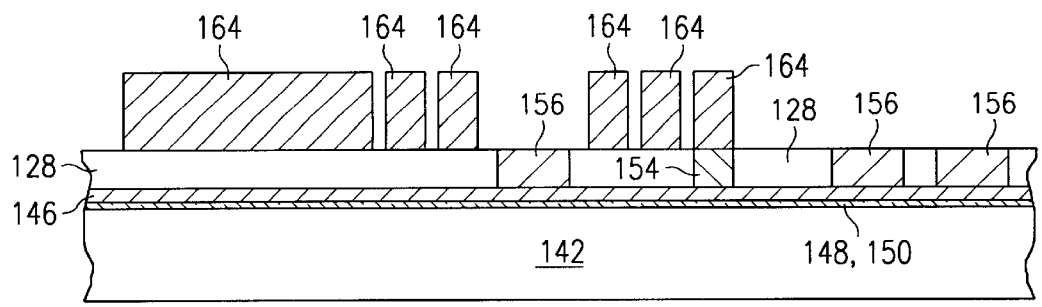
Figure 7K:
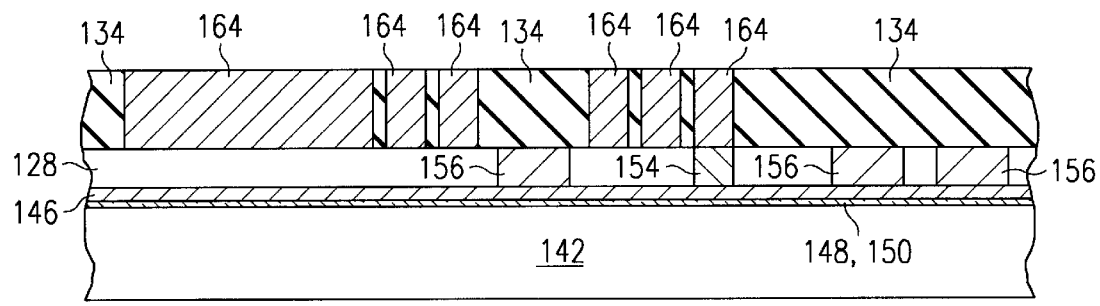
Figure 7L:
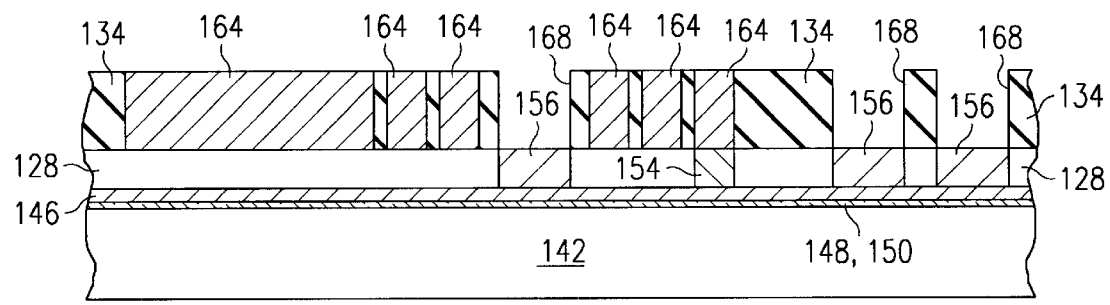
Figure 7M:
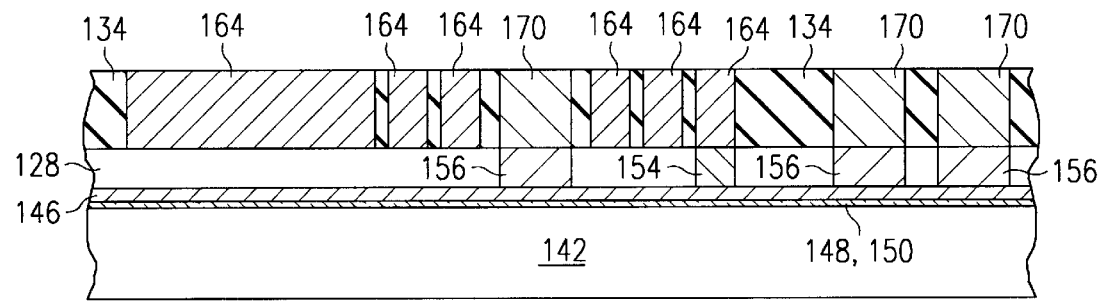
Figure 7N:
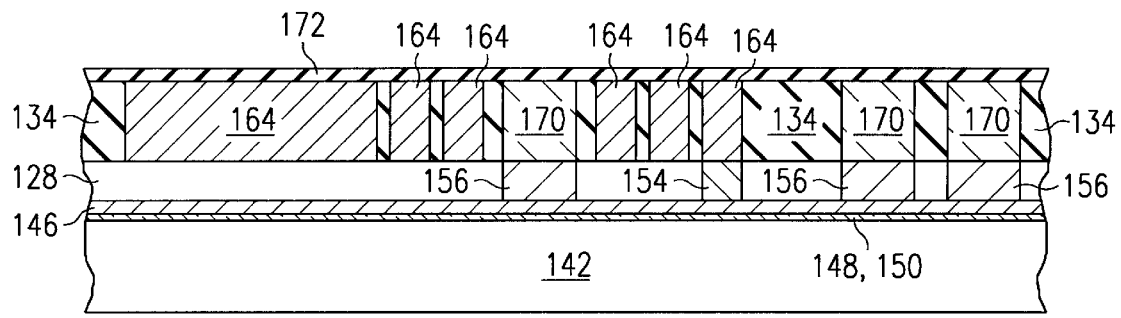

As shown in FIG. 7J, the exposed portions of the seed, or copper layer, 158 are next etched away, and a permanent dielectric layer 134, as shown in FIG. 7K, is formed over the structure and to the top level of the copper elements 164. The thickness of the dielectric layer 134 may be, for example, between about 10 $\mu$m and 20 $\mu$m, and may preferably be about 15 $\mu$m. The portions of the dielectric layer 134 are patterned to form windows 168 exposing the underlying nickel-iron plugs 156, as shown in FIG. 7L The nickel-iron plugs 170 are then formed in the windows 168 to contact the underlying nickel-iron plugs 156, as shown in FIG. 7M. The resulting nickel-iron plugs 170 extend to the top layer of the dielectric 134 to enable them to subsequently be contacted, as described below. An additional dielectric layer 172 is then formed overall to encapsulate the copper elements 164 and nickel-iron elements 170, as shown in FIG. 7N.

Figure 7O:
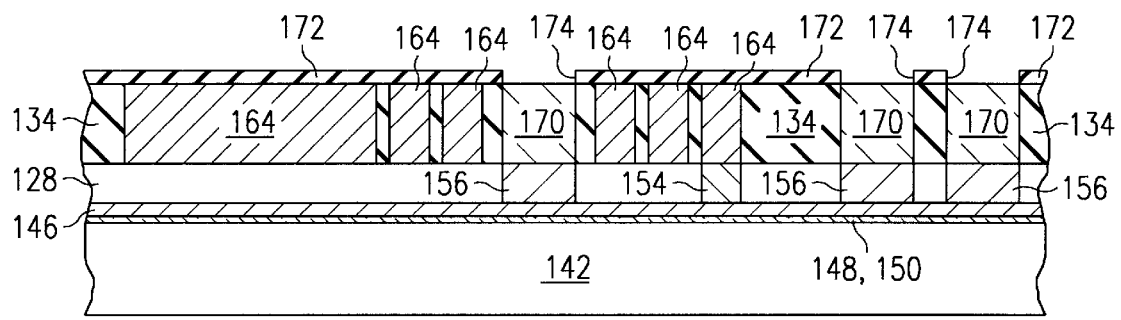
Figure 7P:
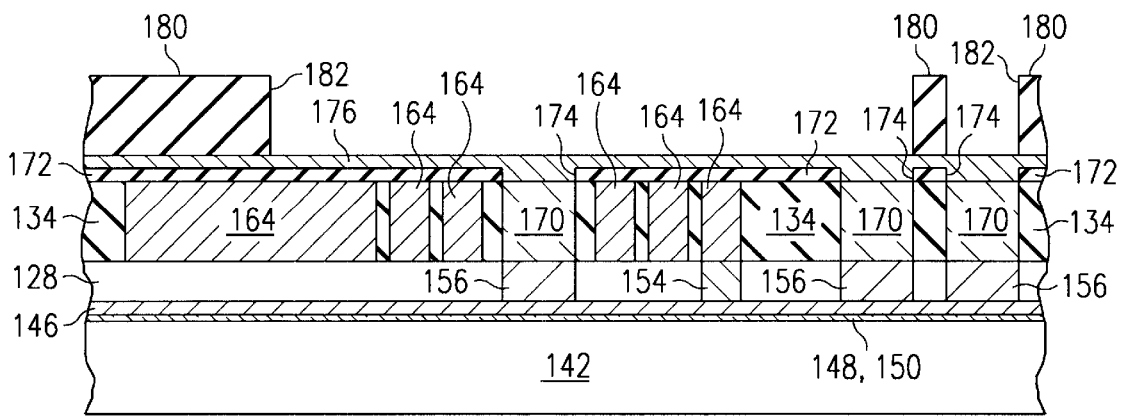

The dielectric layer on 172 is then imaged and etched to form windows 174 to expose the nickel-iron plugs 170, as shown in FIG. 7O. A seed material, or copper layer, 176 is then formed overall, contacting the nickel-iron plugs 170 within the windows 174, as shown in FIG. 7P. The copper layer may be, for example, 2000 Å to 4000 Å thick. In addition, a layer of photoresist 180 is formed overall and patterned to form windows 182 to enable the next layer of nickel-iron features to be formed.

Figure 7Q:
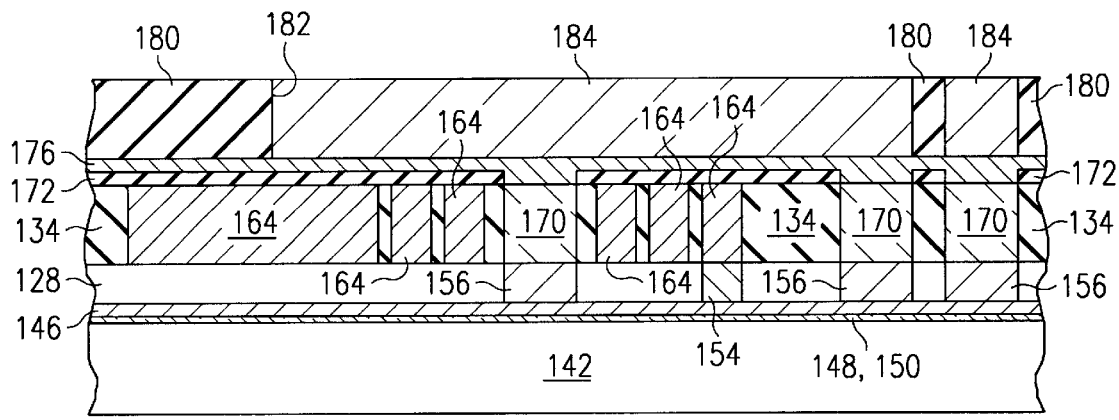
Figure 7R:
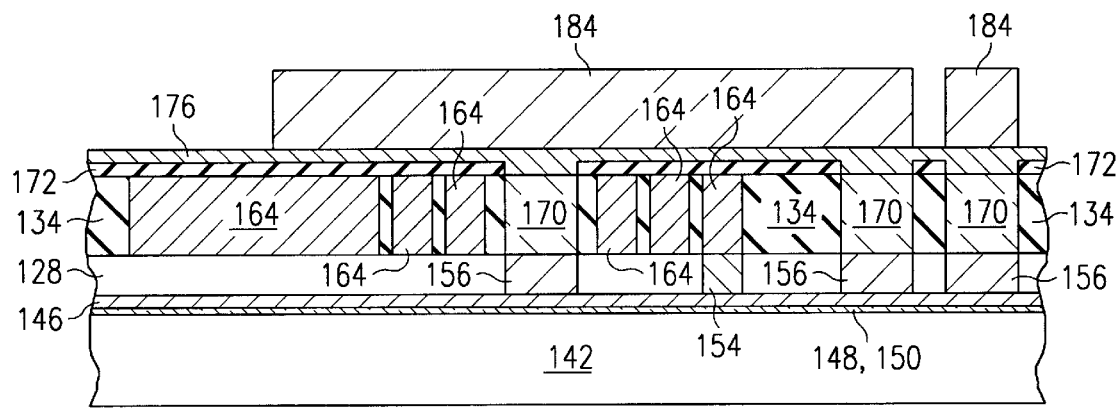
Figure 7S:
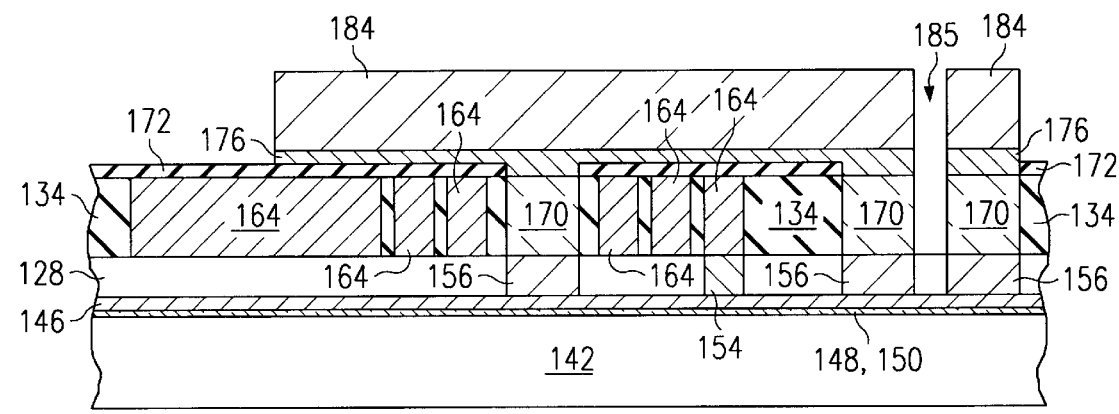

The nickel-iron features 184 are subsequently formed in the windows 182, as shown in FIG. 7Q. The depth of the window 182 into which the nickel-iron structures 184, and therefore the depth of the nickel-iron structure 184, may be, for example, between about 20 $\mu$m and 100 $\mu$m, and may preferably be about 40 $\mu$m. It will be appreciated that the nickel-iron regions 184 contact the underlying nickel-iron regions 170 through the copper layer 176, and form the top half of the "I" shaped nickel-iron structure 136 shown in FIG. 6. The photoresist layer 182 is then stripped, as shown in FIG. 7R. Next, as shown in FIG. 7S, the portions of the copper layer 176 and the dielectric 166 which lie between the two nickel-iron bars is removed, to form a portion of the gap 185. The dielectric and silicon materials may be removed from the gap 185, for example, using one or more directional plasma etching techniques and appropriate masking. The width of the gap 185 may be, for example, between about 3 $\mu$m and 15 $\mu$m, and may preferably be about 75 $\mu$m.

Figure 7T:
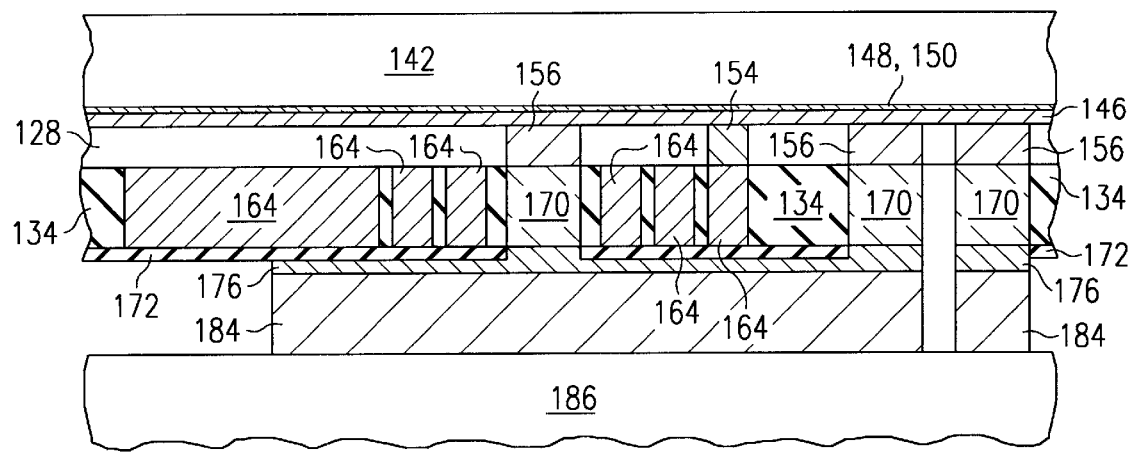
Figure 7U:
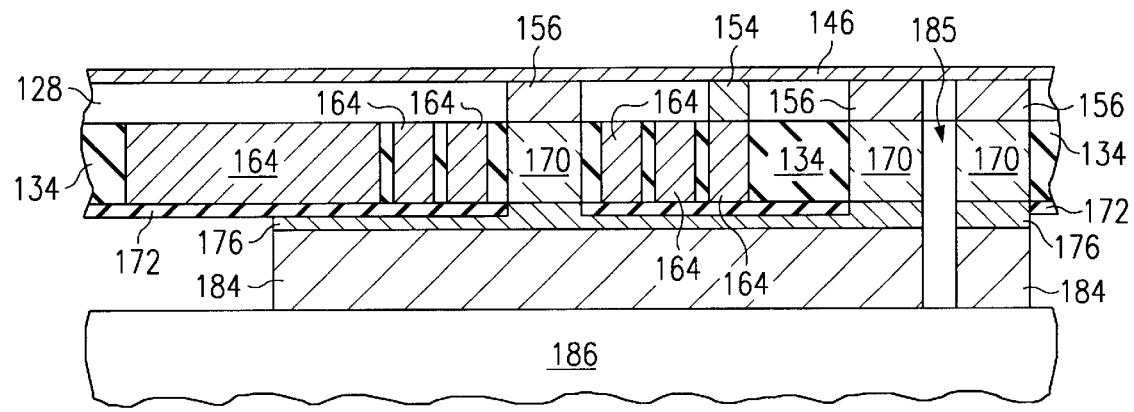

At this point, the entire assembly is flipped and mounted to another sacrificial carrier 186, as shown in FIG. 7T. The original silicon sacrificial carrier wafer 142 and the glass layers 148 and 150 are then removed, as shown in FIG. 7U.

Figure 7V:
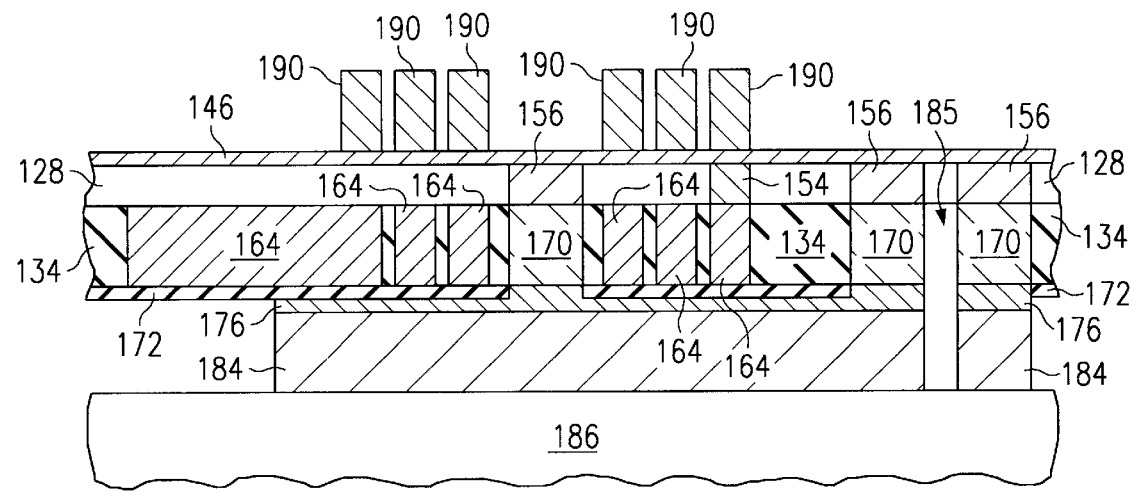
Figure 7W:
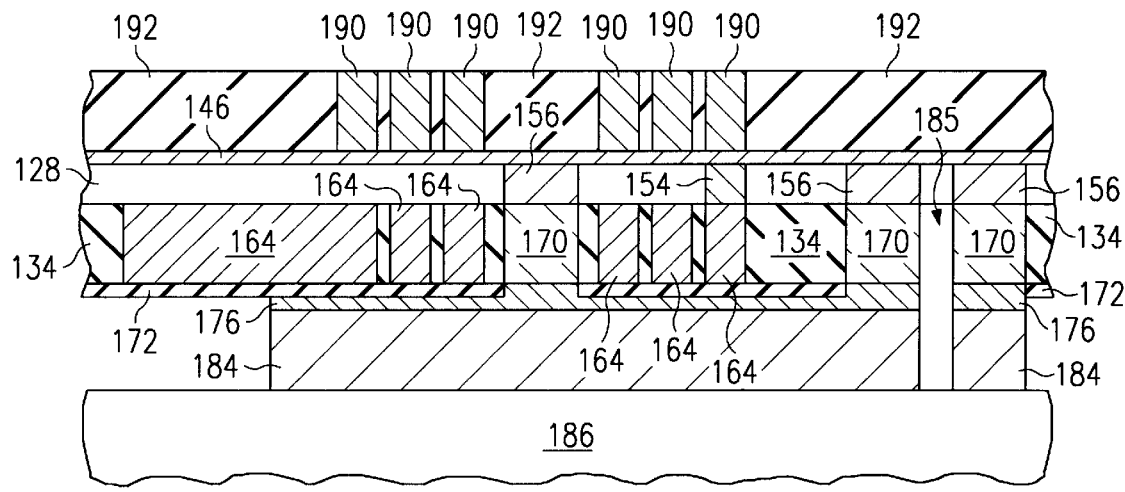

Following the removable of the original sacrificial carrier wafer 142, the process is essentially repeated on the opposite side of the silicon substrate 128. Thus, as shown in FIG. 7V, the copper layer 146 is coated with photoresist, which is patterned and selectively removed to enable copper material 190 to be plated into the patterned windows. The copper material 190 will complete the second half of the coils 130 to be constructed. Contact between the top and bottom coil members is made by the feedthrough conductor 154 formed in FIG. 7E above. The photoresist material is then removed. The top surface of the structure is then recoated with a another photoresist layer 192, as shown in FIG. 7W.

Figure 7X:
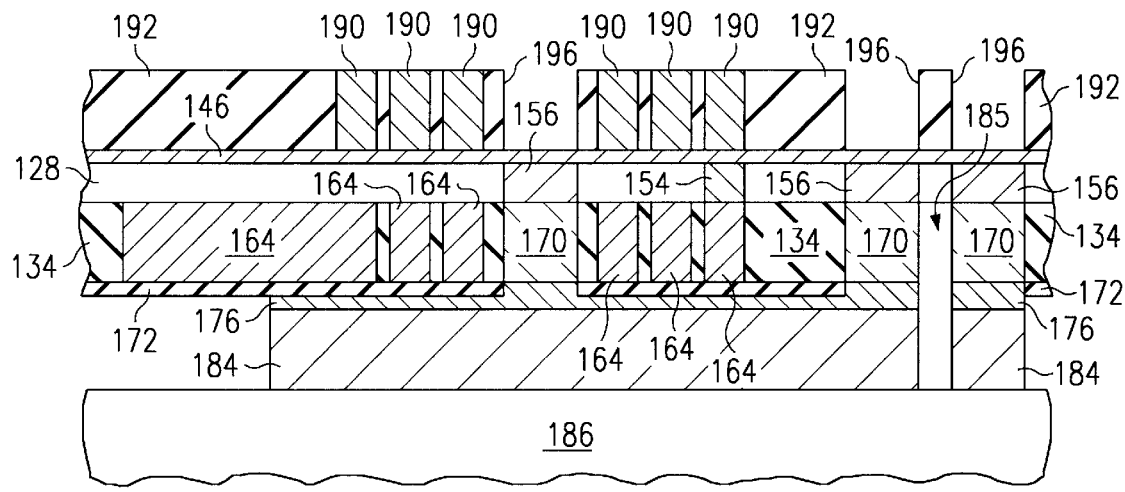
Figure 7Y:
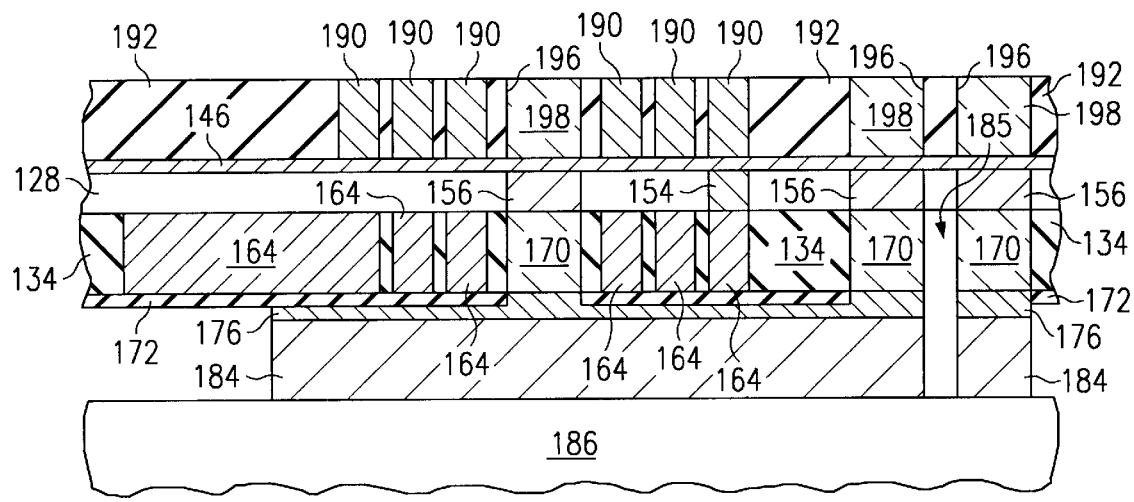

As shown in FIG. 7X, the photoresist layer 192 is patterned and etched to the copper layer 146 overlying the nickel-iron plugs 170. The etching leaves windows 196, as shown. Additional nickel-iron features 198 are formed in the windows 196, as shown in FIG. 7Y. The nickel-iron features 198 contact the copper layer 146 overlying the lower portion of the structure.

Figure 7Z:
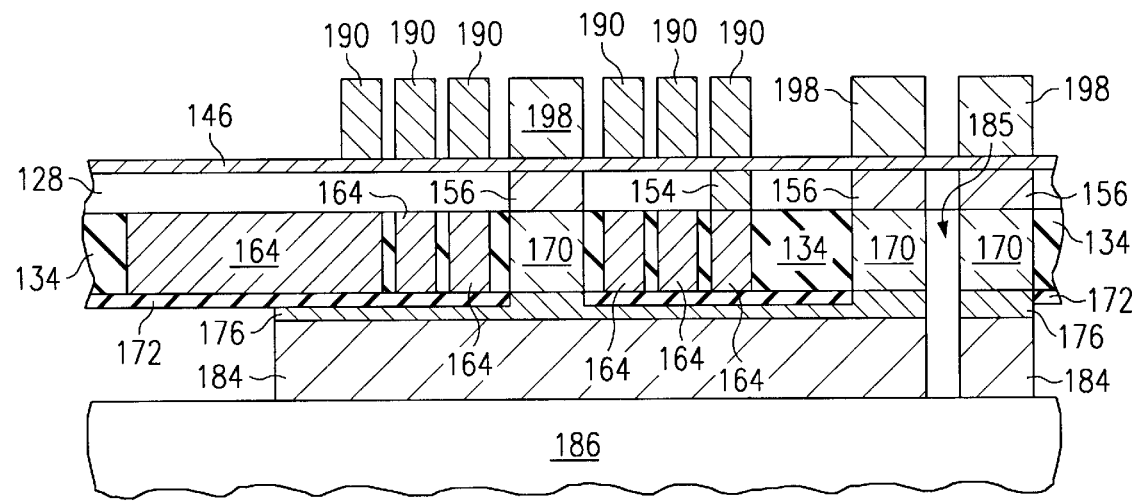
Figure 7A:
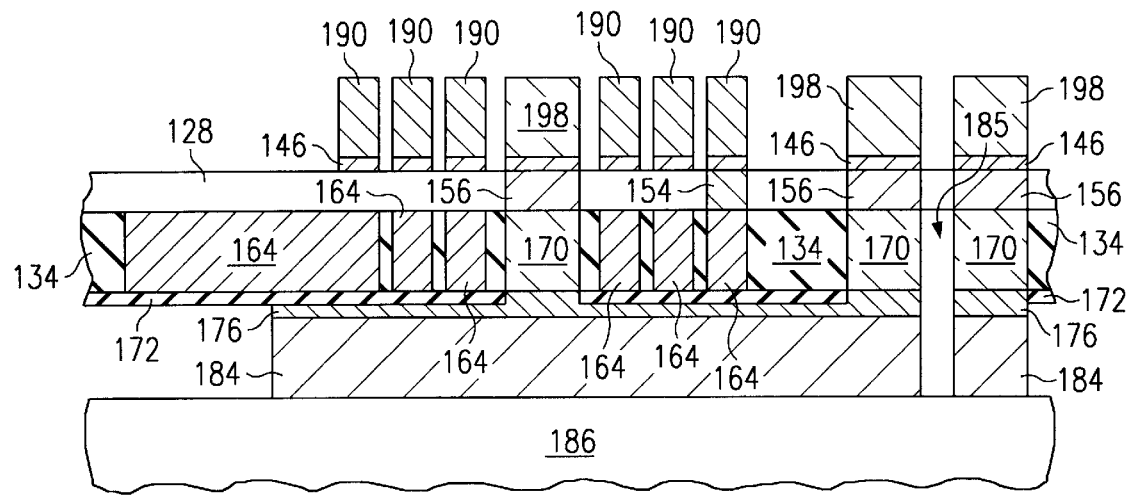
Figure 7B:
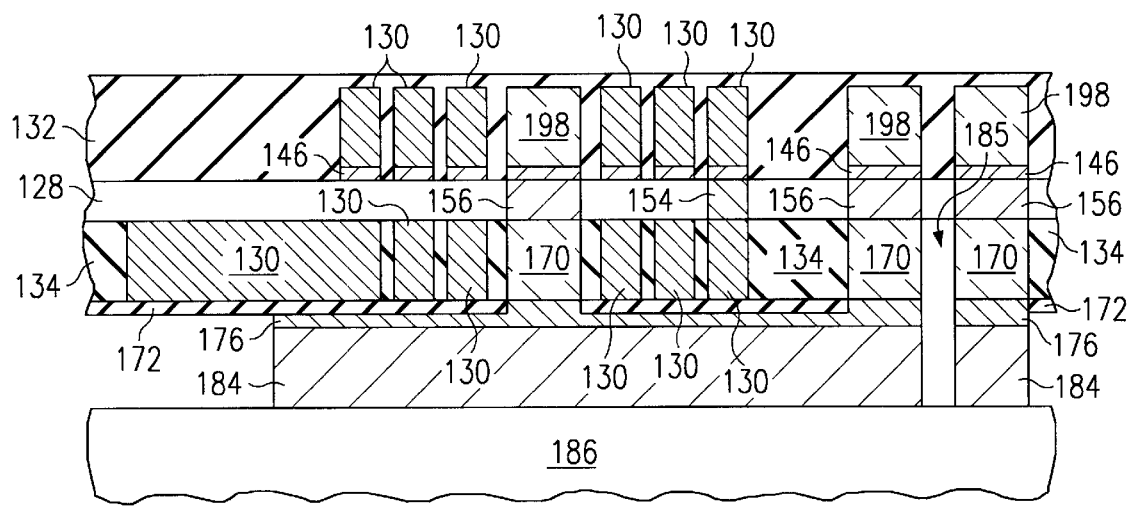
Figure 7C:
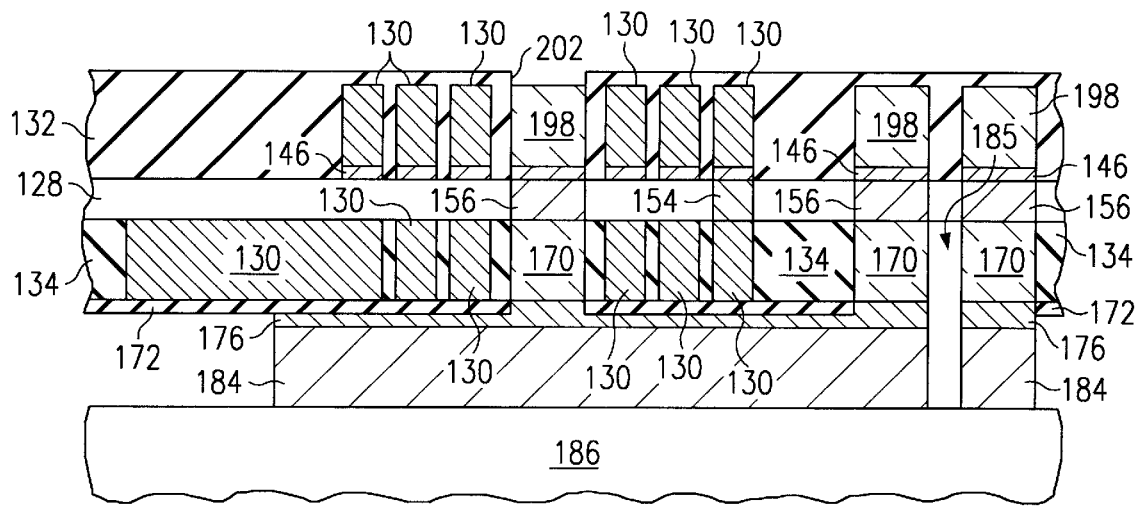
Figure 7D:
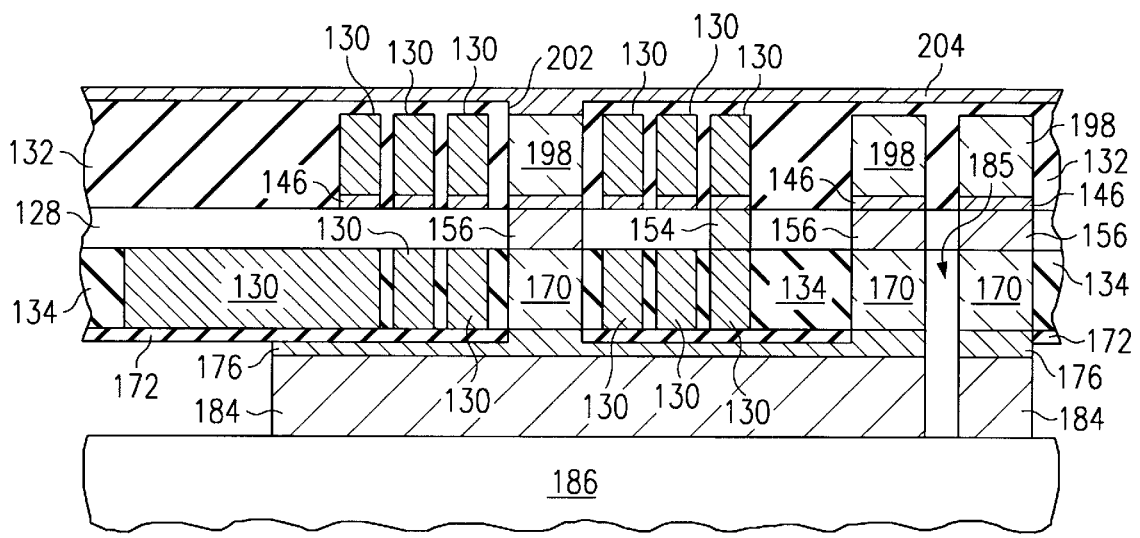
Figure 7E:
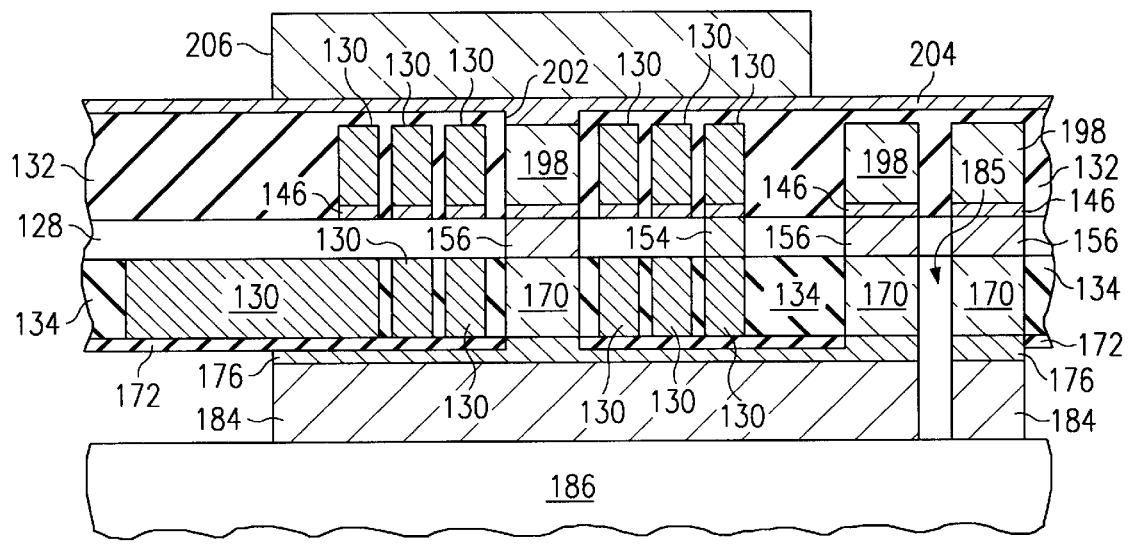
Figure 7F:
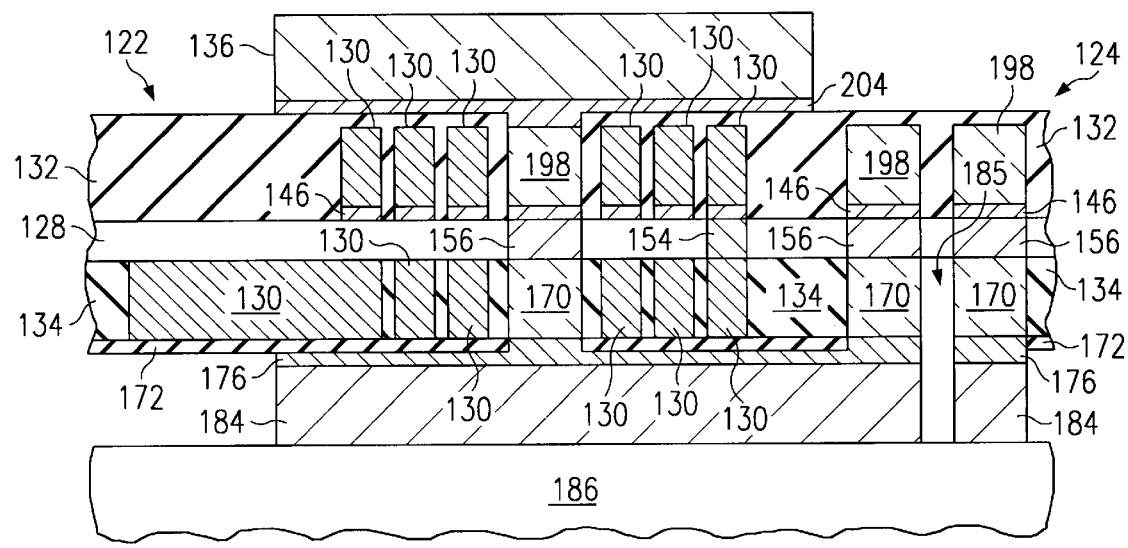
Figure 7G:
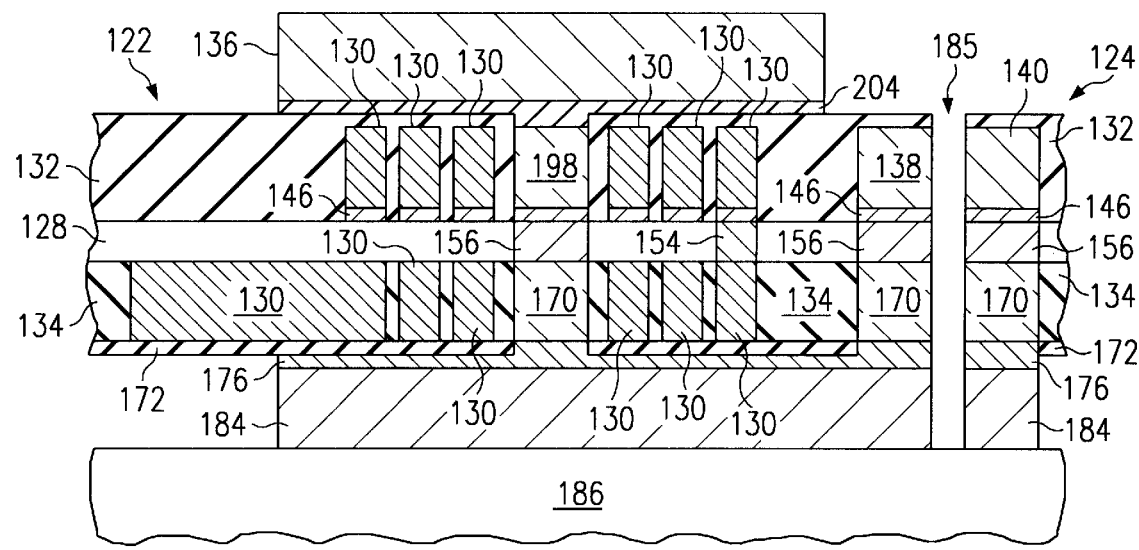
Figure 7H:
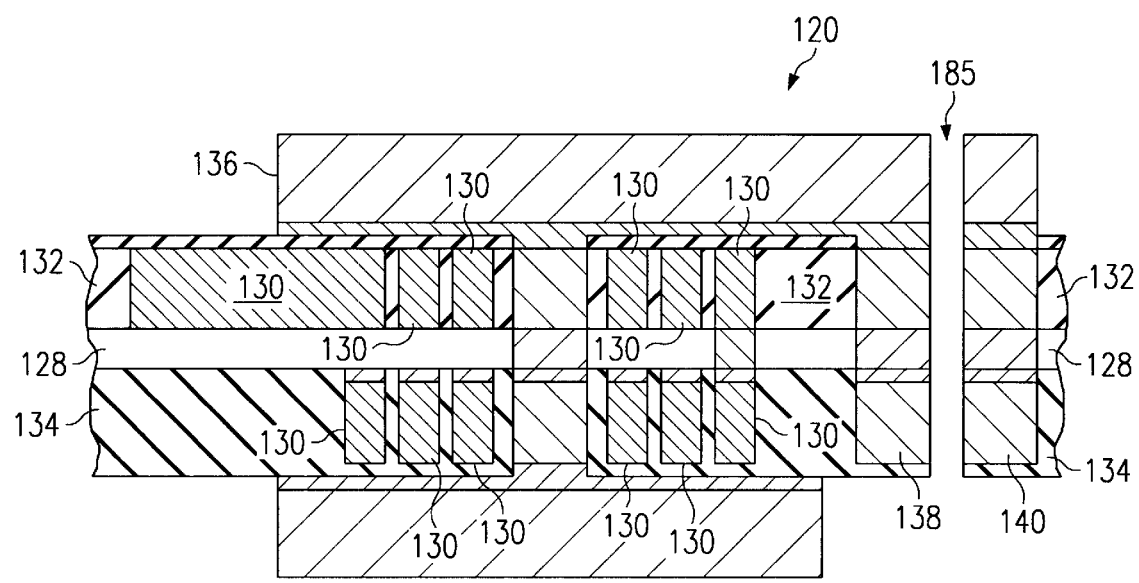

The top dielectric or photoresist layer 192 is then stripped from the structure, as shown in FIG. 7Z. The exposed portions of the copper layer 146 are then removed, as shown in FIG. 7AA. At this juncture, it should be observed that the nickel-iron structures are now continuous and isolated from the copper structures 164 and 190 forming the coils 130 of the microactuator. At this point, as shown in FIG. 7BB, a layer of permanent dielectric material 132 is formed over the structure. The thickness of the dielectric layer 132 may be the same as that of the previously formed dielectric layer 134. The dielectric layer 132 is then imaged, and a pattern is etched to expose the top portion of the nickel-iron plug 198 through window 202, as shown in FIG. 7CC.

A layer of a seed material 204, preferably copper, or the like is deposited overall, as shown in FIG. 7DD. The copper layer may be, for example, 2000 Å to 4000 Å thick. A nickel-iron top plate member 206 is patterned and formed on the copper layer 204 as shown is FIG. 2EE. At this juncture, it should be observed that the top nickel-iron member 206 contacts the lower nickel-iron member 184 through the central nickel-iron and copper regions 198 and 170, as shown, to form the "I" shaped nickel-iron member 136 described in FIG. 6, surrounded by the copper coils 130. The remaining copper material of layer 204 which is exposed is then removed, as shown in FIG. 7FF.

As shown in FIG. 7GG, the dielectric and silicon separating the frame and platform structures is selectively removed from the gap 185, leaving only the tethers connecting the frame to the platform. At this juncture, it should be observed that the structures 138 and 140 are completed to form the flux transfer structures for coupling the magnetic flux from the "I" nickel-iron structure to move the platform structure 124.

Finally, the second sacrificial carrier wafer 186 is removed as shown in FIG. 7HH, and the structure is inverted to complete the construction of the microactuator 120.

Figure 8:
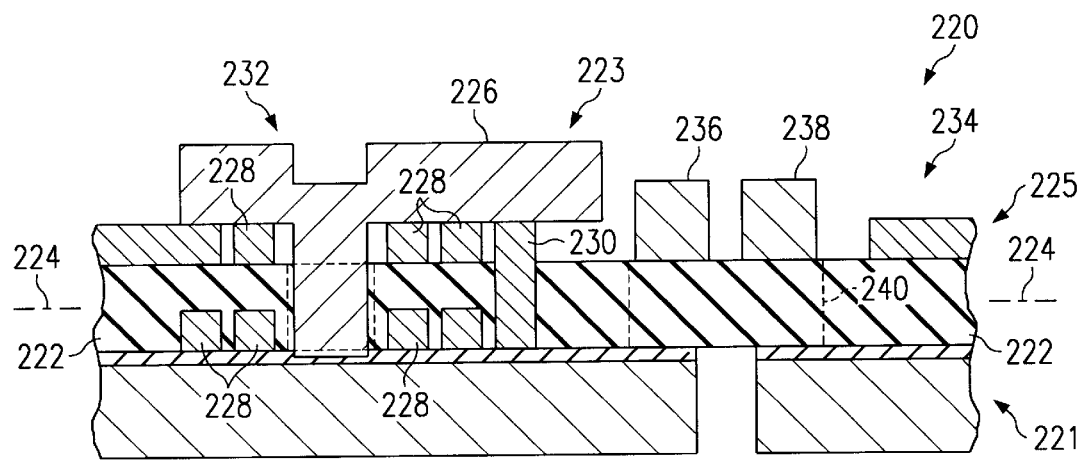
FIG. 8 is a side cross-section of a microactuator structure, according to a preferred embodiment of the invention, constructed using a piece-part method, according to a preferred method embodiment of the invention.

Another technique for accomplishing a microactuator device having symmetry about a supporting substrate can be accomplished by a piece-part assembly technique. A device that results from a piece-part assembly technique, according to the invention, is shown in cross-section in FIG. 8. The device, denoted by the reference numeral 220, is formed on a substrate, which may be, for example, a flex printed wiring board (PWB) 222.

It can be seen that the volume, modulus, and mass of the devices on either side of the centerline 224 are substantially the same. As will be seen, the construction of the actuator 220 is accomplished with three piece-parts, denoted piece-part A 221, piece-part B 223, piece-part C 225. The resulting structure has an "I" shaped nickel-iron flux-conducting structure 226 that is excited by copper coils 228. The copper coils 228 on top and bottom of the PWB 222 are interconnected by a feedthrough conductor 230.

The frame portion 232 of the actuator assembly 220 is rigidly connected to the arm, for example, of a mass data storage device, with an internal tethered platform member 234 located within the window in the frame 232. Corresponding nickel-iron flux-conducting members 236 and 238 are provided as a part of the respective piece-parts, which, when fabricated, are located through an aperture 240 in the PWB 222 to conduct the flux from the nickel-iron member 226 on the frame 232 to the nickel-iron member 238 on the platform member 234.

Figure 9:
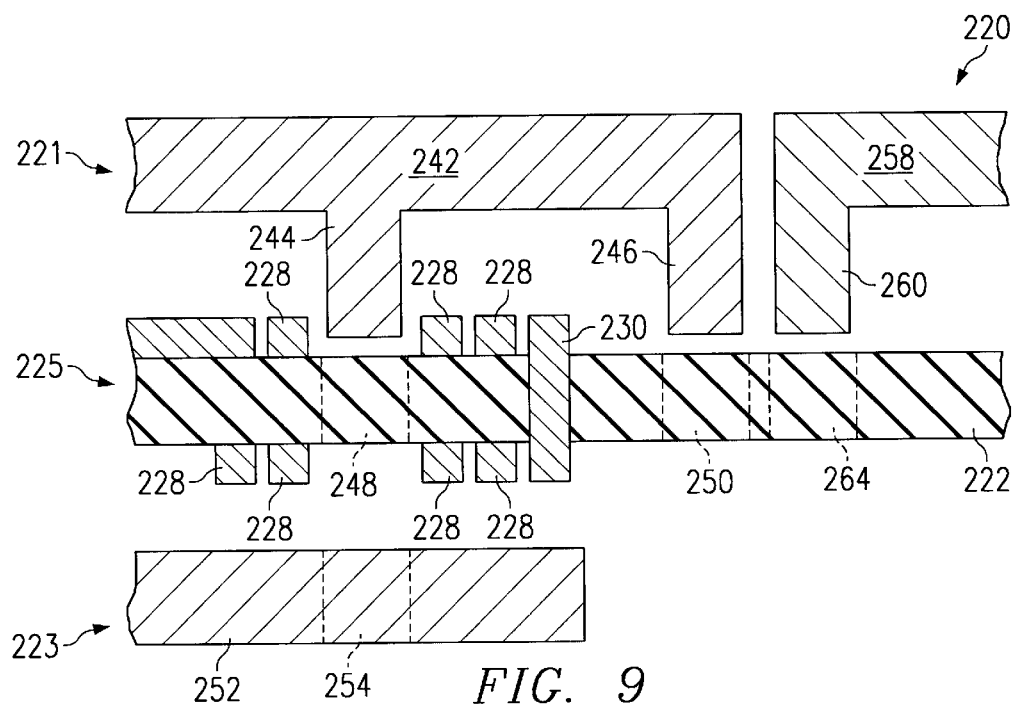
FIG. 9 is an exploded side cross-section of the microactuator structure of FIG. 8.

More particularly, with reference now to FIG. 9, an exploded view of the microactuator 220 is shown illustrating the assembly of the respective three piece-parts. Thus, piece-part C 225 is first constructed using a PWB 222 having copper coils 228 and coil feedthrough conductor 230 constructed thereon. Piece-part A 221 is constructed of nickel-iron and has pillars 244 and a bar 246 outwardly extending from a top member 242. The pillars 244 and the bar 246 are received in holes 248 and 250 formed through the PWB 222. Piece part A 221 also includes a nickel-iron member having another bar 260 that extends downwardly from a horizontal member 258. The bar 260 is received in a hole 264 through the PWB 222 to provide the flux receiving members on the platform 234 of the microactuator 220. Piece-part B 223 is another nickel-iron member having a hole 254 therethrough to receive the pillars 244 extending through the hole 248 on the bottom side of the PWB 222. Piece-part C 225 includes the PWB 222 and coil members 228.

The method for the construction of piece-part A 221 is shown in the cross-section views of FIGS. 10A–10E. Thus, with reference first to FIG. 10A, in the construction in piece-part A 221, a carrier silicon wafer 266 is plated with a seed metal layer 268, such as copper or the like, and a nickel-iron layer 270 is formed thereover. The nickel-iron layer 270 may be, for example, of thickness of between about 20 μm and 120 μm, and may preferably be about 60 μm. The nickel-iron layer 270 is patterned to form windows 272 therein. The nickel-iron layer 270 will provide the bottom motor structure, as will become apparent.

Figure 10A:
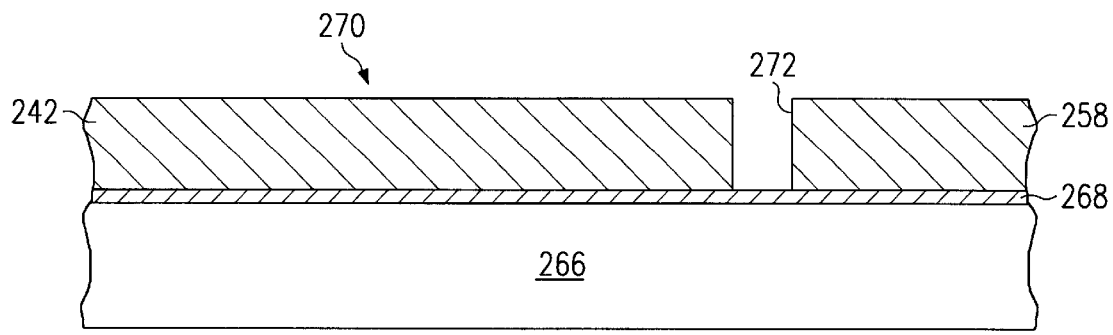
FIGS. 10A–10E are side cross-section drawings illustrating the sequence of steps used in making Piece-part A used in the construction of the microactuator structure of FIG. 8, according to a preferred embodiment of the invention.
Figure 10B:
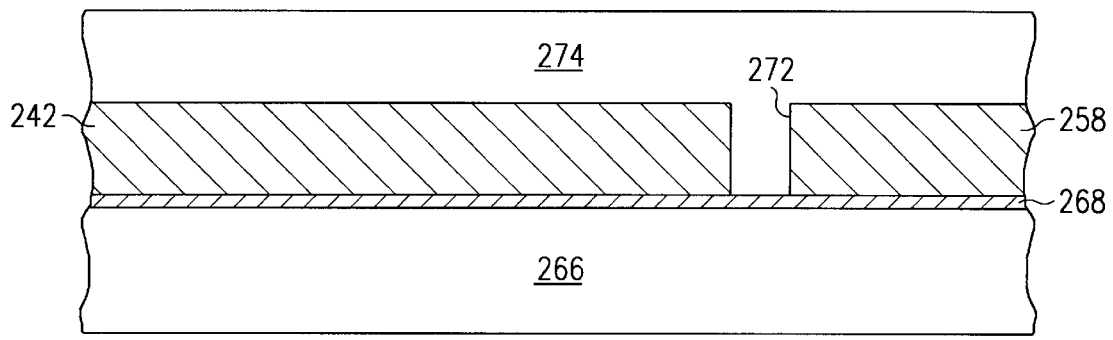
Figure 10C:
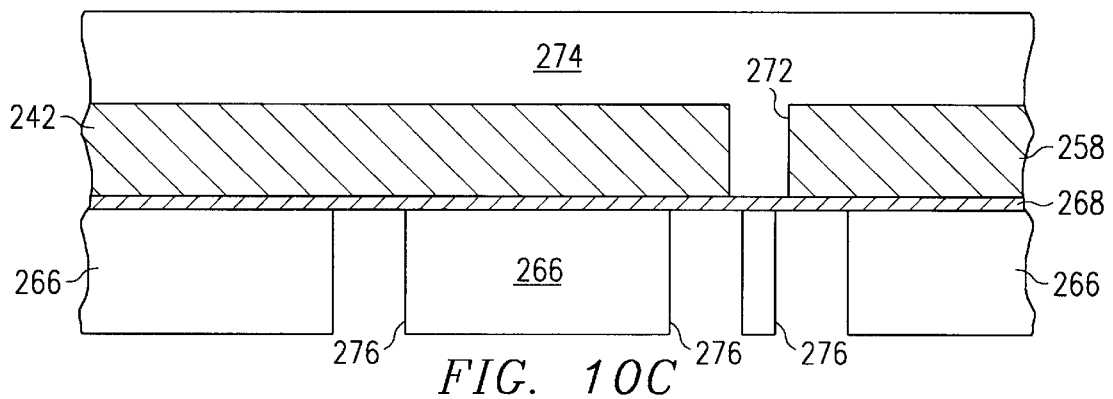
Figure 10D:
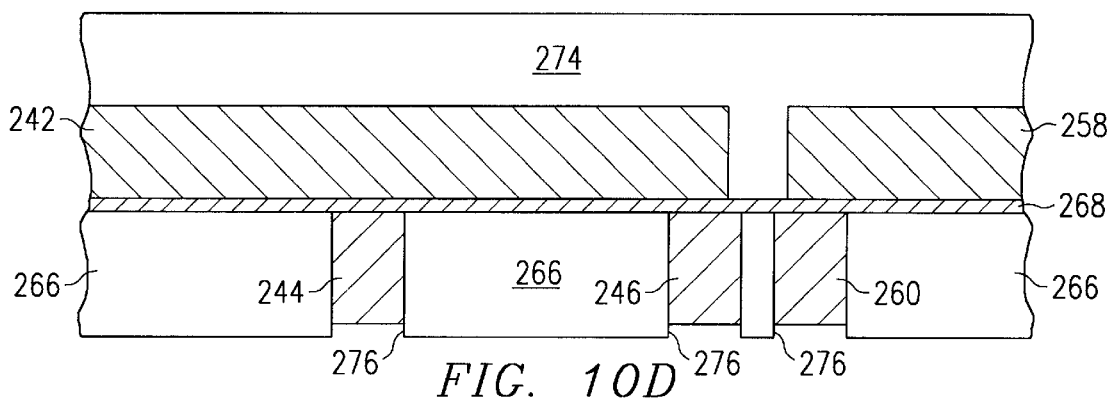
Figure 10E:
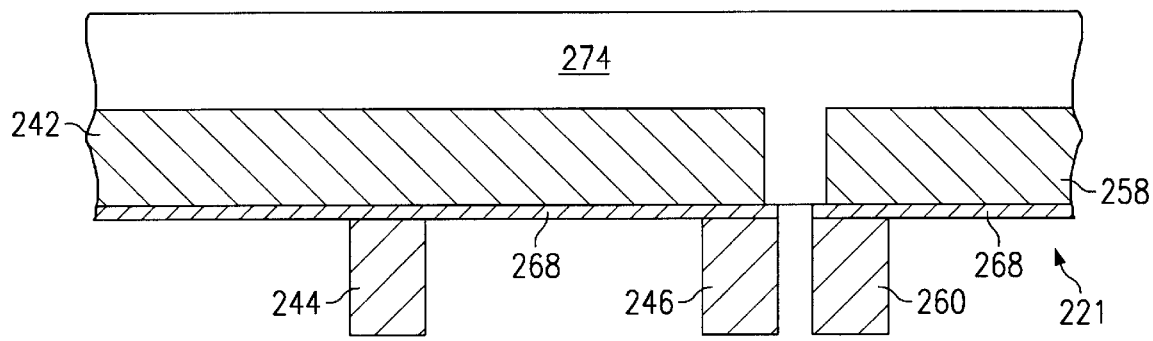

As shown in FIG. 10B, a layer of photoresist 274 is deposited over the nickel-iron layer 270 and in the windows 272 thereof to temporarily immobilize the entire structure. Although the use of photoresist is presently preferred, other materials, such as polystyrene, benzoic acid, or the like may also be used to provide a dimensionally stable structure. Such other materials, however require consideration how they can be removed, such as through the use of particular solvents, vacuum sublimation techniques, and so forth. Windows or trenches 276 are etched in the silicon carrier 266 to form the nickel-iron core and motor gap pattern, as shown in FIG. 10C. Nickel-iron elements 244, 246, and 260 are then plated into the trenches 276 in the silicon carrier 266, as shown in FIG. 10D. The width of the nickel-iron elements 244, 246, and 260 may be, for example, between about 25 μm and 200 μm, and may preferably be about 75 μm. Then, as shown in FIG. 10E, the silicon carrier material 266 is removed. It should be noted that the removal of the silicon material between frame 246 and the platform 260 forms the gap between the platform and frame portion of the structure. This completes the construction of piece-part A 221.

Figure 11A:
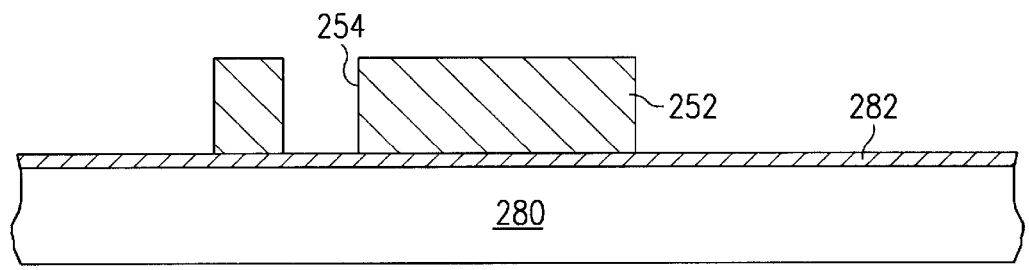
FIGS. 11A–11C are side cross-section drawings illustrating the sequence of steps used in making Piece-part B used in the construction of the microactuator structure of FIG. 8, according to a preferred embodiment of the invention.
Figure 11B:
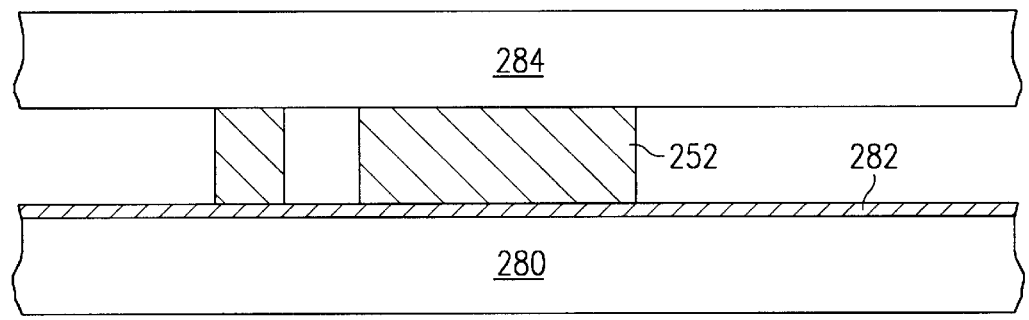
Figure 11C:
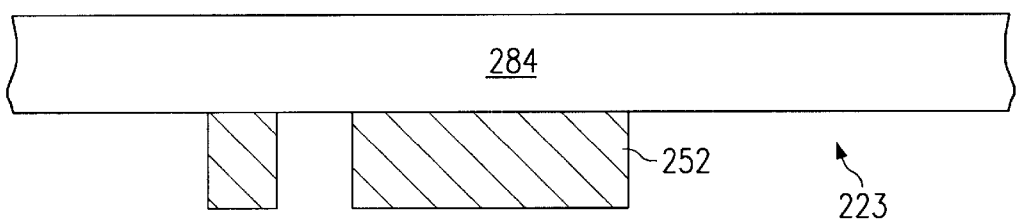

The construction of piece-part B 223 is illustrated in the sequential steps shown in the cross-section views in FIGS. 11A–C to which reference is now additionally made. At the outset, a carrier silicon wafer 280 is provided, and coated with a seed material 282, such as copper or the like. A nickel-iron layer 252 is formed on the copper layer 282 and patterned with a window 254 to form the top motor structure. The nickel-iron layer 252 may have approximately the same width as the nickel-iron member 242 of piece-part A 221, described above. An immobilizing wafer mount layer 284, which may be of a photoresist or other suitable material, is formed onto the top surface of the patterned nickel-iron layer 252, as shown in FIG. 11B. Again, Although the use of photoresist is presently preferred, other materials, such as polystyrene, benzoic acid, or the like may also be used to provide a dimensionally stable structure. Finally, as shown in FIG. 1C, the carrier silicon wafer 280 and copper layer 282 are removed, for example, using a wet or dry chemical etching method. This completes the construction of piece-part B 223.

The construction of piece-part C 225 is illustrated in FIGS. 12A–12D to which reference is now additionally made. The structure again begins with the provision of a carrier silicon wafer 286 which has been coated with a seed material 288, which may be copper or the like. The seed material 288 is coated with a photoresist material (not shown), which is patterned to provide the required shape mold for the subsequent deposition of copper to form the copper coils and system interconnects.

Figure 12A:
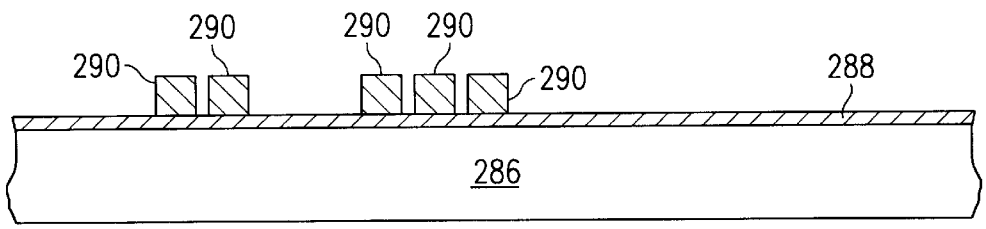
FIGS. 12A–12D are side cross-section drawings illustrating the sequence of steps used in making Piece-part C used in the construction of the microactuator structure of FIG. 8, according to a preferred embodiment of the invention.
Figure 12B:
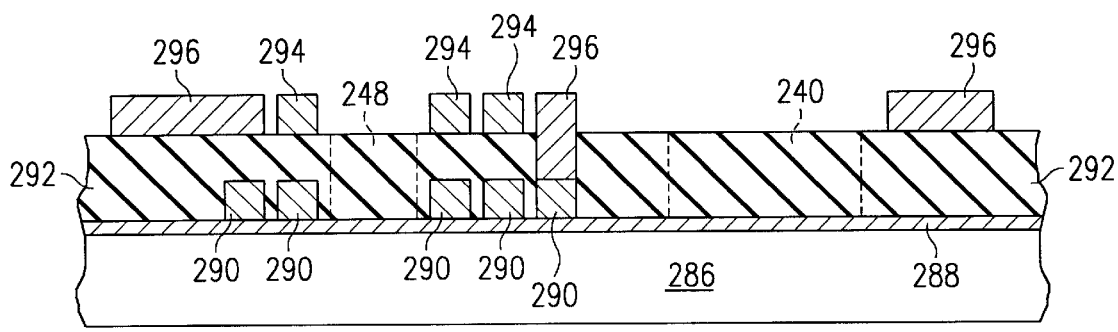

The photoresist is then removed leaving a portion of the copper coils and interconnects 290, as shown in FIG. 12A. As shown in FIG. 12B, a PWB material 292 is then formed onto the surface of the copper layer 288. The PWB material may be of width, for example, between about 100 $\mu$m and 200 $\mu$m, and may preferably be about 125 $\mu$m. Additional copper regions are selectively formed to complete the coils 294 and interconnections 296. The width of the copper elements 228 and 230 may be, for example, between about 5 $\mu$m and 15 $\mu$m, and may preferably be about 10 $\mu$m. The PWB material in the regions that will receive the nickel-iron piece-parts is then removed to form windows 240 and 248. It is noted that portions of the PWB material forming the window 240 will remain in the area of the gap between the platform and transducer carrying arm structures; however, the stiffness of the PWB material is very low, and does not affect the operation of the resulting device.

Figure 12C:
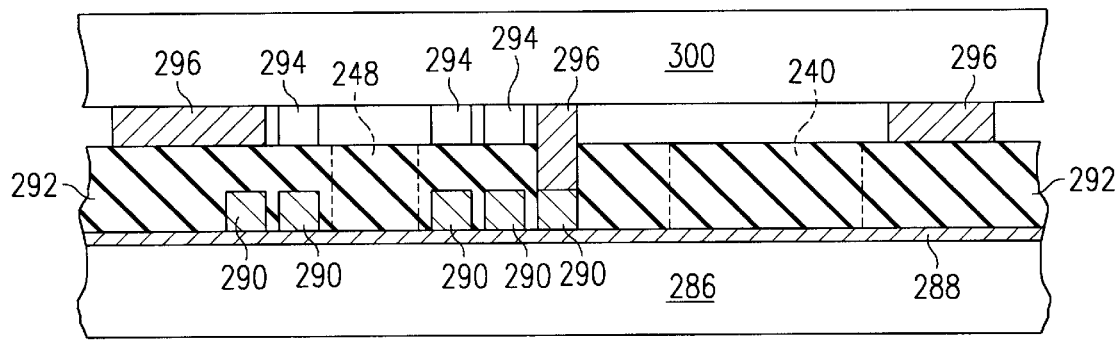
Figure 12D:
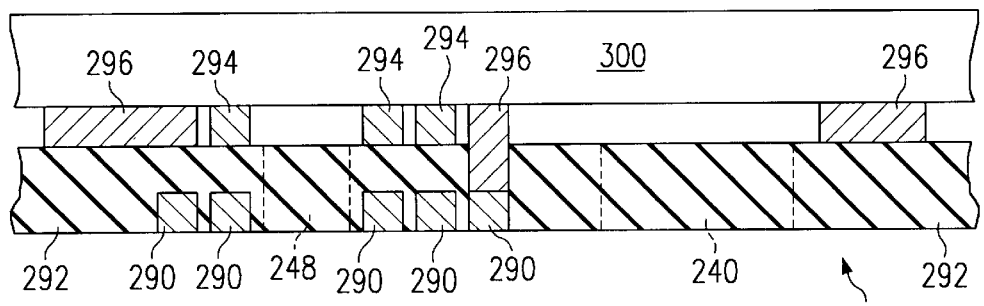

Next an immobilizing layer 300 is formed over the exposed copper material of the coils 284 and interconnects 296, as shown if FIG. 12C. The immobilizing layer may be, for example, photoresist or other suitable material. Finally, as shown in FIG. 12D, the carrier silicon wafer 286 and copper layer 288 are removed, for example, using a wet or dry chemical etching method or another technique. This completes the construction of piece-part C.

Figure 13A:
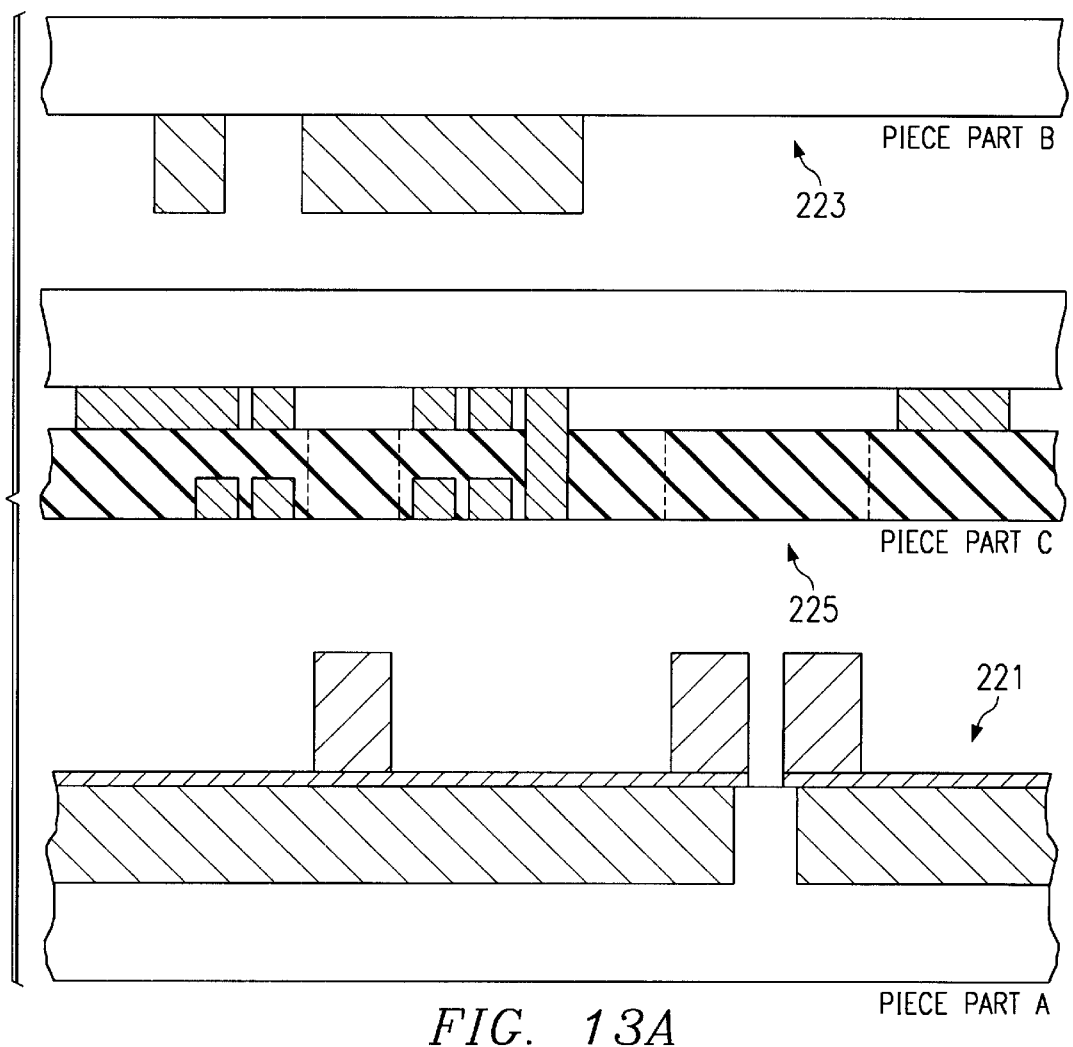
FIGS. 13A–13E are side cross-section drawings illustrating the sequence of steps used in assembling Piece-parts A–C used in the construction of the microactuator structure of FIG. 8, according to a preferred embodiment of the invention.
Figure 13B:
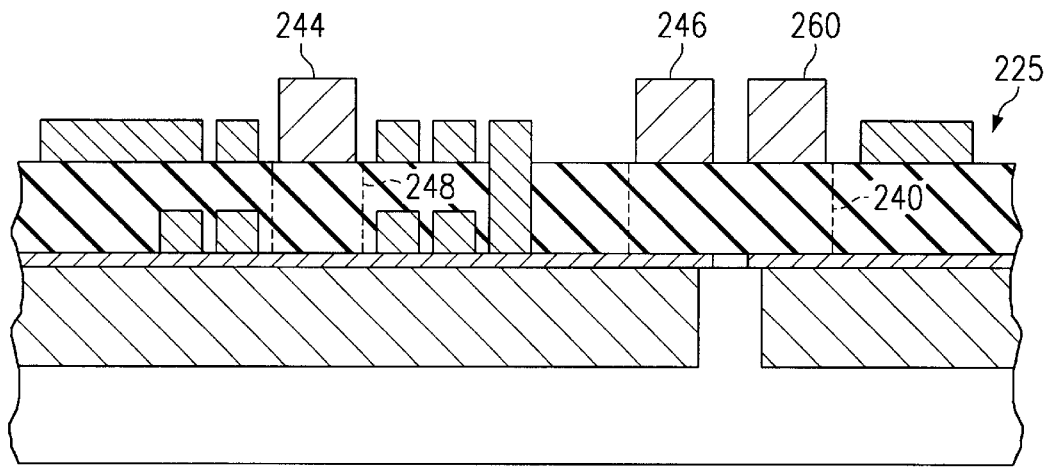

Thus, as seen in FIG. 13A, piece-part A 221, piece-part B 223, and piece-part C 225 are provided to enable the assembly of the final microactuator. With reference additionally now to FIG. 13B, piece-part A 221 is first assembled into piece-part C 225, with the upstanding leg members 244, 246 and 260 inserted through the apertures 248 and 240. The carrier material 300 (see FIG. 12D) is then removed.

Figure 13C:
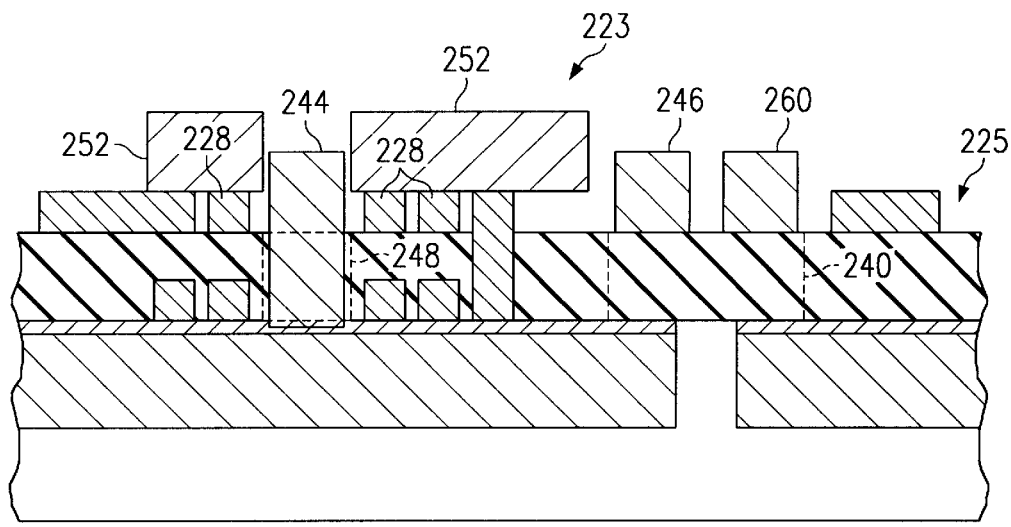
Figure 13D:
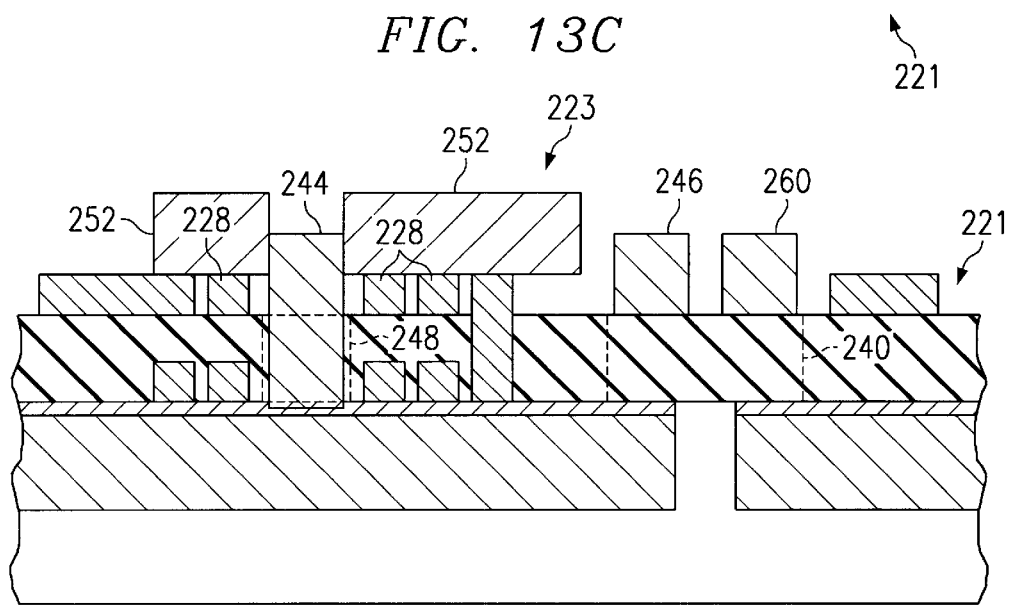

Piece-part B 223 is then placed over the upstanding leg 244 of piece-part A 221 and against the copper elements of piece part C 225, as shown in FIG. 13C. As shown in FIG. 13D, the nickel-iron components 244 and 252 are then electrolytically flash plated to connect to form a single structure. The carrier material 284 (see FIG. 1C) is then removed.

Figure 13E:
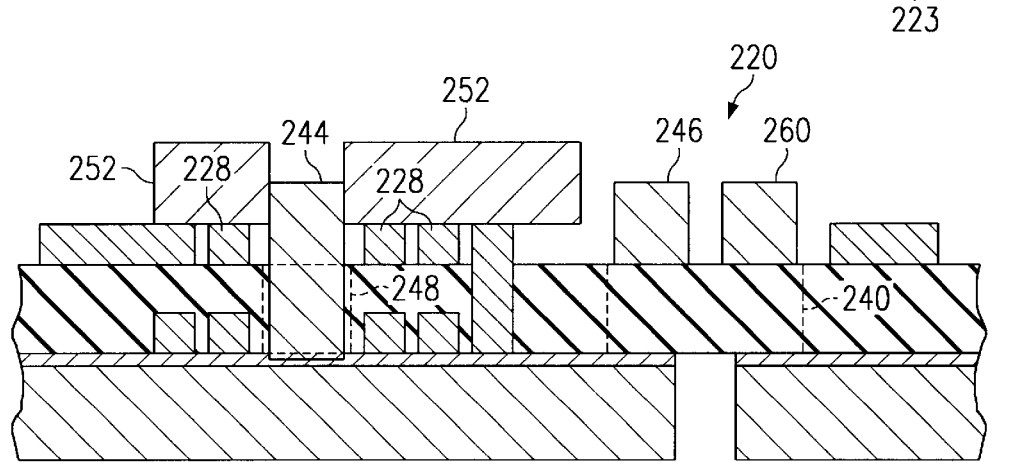

Finally, the temporary immobilization material 274 (see FIG. 10E) is removed from piece-part A 221 to complete the microactuator structure 220, as shown in FIG. 13E.

Although the invention has been described and illustrated with a certain degree of particularity, it is understood that the present disclosure has been made only. by way of example, and that numerous changes in the combination and arrangement of parts can be resorted to by those skilled in the art without departing from the spirit and scope of the invention, as hereinafter claimed.

What is claimed is:

1. A method for making a microactuator, comprising:
   providing first, second, and third substrates;
   adhering said first and second silicon wafers together;
   thinning said first silicon wafer to a desired substrate thickness;
   patterning first windows through said first silicon wafer to form a mold;
   forming coil and flux-conducting interconnect features in respective said first windows through said first substrate;
   forming first partial microactuator structures on one side of said first substrate by:
      patterning a first layer of photoresist on said one side of said first substrate to form a mold to contain coil portions and coil interconnection traces;
      molding coil material into the mold of said first layer of photoresist to form said coil portions and said coil interconnection traces;
      removing said first layer of photoresist;
      forming a first permanent dielectric layer overall;
      patterning said first permanent dielectric layer to form second windows to expose said flux-conducting interconnect features;
      forming additional flux-conducting features in said second windows of said first permanent dielectric layer to contact said exposed flux-conducting interconnect features;
      patterning a second photoresist layer over said first layer of dielectric to form a mold for top flux-conducting features;
      forming top flux-conducting features in said mold in said second photoresist layer;
      stripping the second photoresist layer;
      forming at least a portion of a gap between two nickel-iron bars;
      attaching said third substrate to said nickel-iron features;
      forming second partial microactuator structures on another side of said first substrate by repeating the steps to form the first partial microactuator for said another side of said first substrate;
   and removing said second and third substrates from said first substrate.

2. The method of claim 1 wherein said first, second, and third substrates are of silicon.

3. The method of claim 1 wherein said thinning said first substrate comprises lapping said first substrate.

4. The method of claim 1 wherein said thinning said first substrate comprises exposing said first substrate to a flame-like plasma.

5. The method of claim 1 wherein said adhering said first and second silicon wafers together comprises coating said first and second wafers with a layer of high sodium glass, bringing said high sodium glass on said first and second wafers into proximity, and heating at least the high sodium glass to a temperature of about 300° C. and applying a voltage of a few hundred volts.

6. The method of claim 1 wherein said adhering said first and second silicon wafers together comprises coating said first and second wafers with a layer of adhesive and bringing said high sodium glass on said first and second wafers into contact.

7. The method of claim 1 wherein said thinning said first silicon wafer to a desired substrate thickness comprises thinning said first silicon wafer to a thickness of between about 100 $\mu$m and 200 $\mu$m.

8. The method of claim 1 wherein said thinning said first silicon wafer to a desired substrate thickness comprises thinning said first silicon wafer to a thickness of about 125 $\mu$m.

9. The method of claim 1 wherein said first windows are of width of between about 25 $\mu$m and 200 $\mu$m.

10. The method of claim 1 wherein said first windows are of width of about 75 $\mu$m.

11. A The method of claim 1 wherein said first permanent dielectric layer is between about 10 $\mu$m and 20 $\mu$m thick.

12. The method of claim 1 wherein said first permanent dielectric layer is about 15 $\mu$m thick.

13. The method of claim 1 wherein said top flux-conducting features are between about 20 μm and 100 μm thick.

14. The method of claim 1 wherein a said top flux-conducting features are about 40 μm thick.

15. The method of claim 1 wherein said gap is between about 3 μm and 15 μm wide.

16. The method of claim 1 wherein said gap is about 7 μm wide.

17. The method of claim 1 wherein said flux-conducting features are nickel-iron features.

* * * * *